United States Patent
Draganov

(10) Patent No.: US 7,490,008 B2
(45) Date of Patent: Feb. 10, 2009

(54) GPS ACCUMULATED DELTA RANGE PROCESSING FOR NAVIGATION APPLICATIONS

(75) Inventor: Alexander Draganov, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 641 days.

(21) Appl. No.: 11/129,423

(22) Filed: May 16, 2005

(65) Prior Publication Data

US 2006/0195262 A1      Aug. 31, 2006

Related U.S. Application Data

(60) Provisional application No. 60/610,609, filed on Sep. 17, 2004.

(51) Int. Cl.
G01S 5/02      (2006.01)
H04B 7/185    (2006.01)

(52) U.S. Cl. .................. 701/214; 701/215; 342/357.02; 342/357.12

(58) Field of Classification Search .................. 701/213, 701/214, 200, 216, 3, 13, 215; 342/357.02, 342/357.12, 357.14; 455/456.01; 714/800
See application file for complete search history.

(56) References Cited

U.S. PATENT DOCUMENTS

| | | | |
|---|---|---|---|
| 4,646,096 A * | 2/1987 | Brown | 342/357.02 |
| 5,041,833 A | 8/1991 | Weinberg | |
| 5,109,346 A | 4/1992 | Wertz | |
| 5,430,654 A | 7/1995 | Krystos et al. | |
| 5,430,657 A | 7/1995 | Krystos | |
| 5,606,506 A | 2/1997 | Krystos | |
| 5,726,659 A | 3/1998 | Kee et al. | |
| 5,748,651 A * | 5/1998 | Sheynblat | 714/800 |
| 5,787,384 A * | 7/1998 | Johnson | 701/216 |

(Continued)

OTHER PUBLICATIONS

Draganov, et al., "Advanced Techniques for Processing GPS Carrier Measurements in Space Applications," 17th Intl Tech Mtg of Satellite Div, Sep. 21-24, 2004, Long Beach, CA, pp. 2035-2043 (BNSDOCID# XP-002362515).

(Continued)

*Primary Examiner*—Tan Q Nguyen
(74) *Attorney, Agent, or Firm*—Edell, Shapiro & Finnan, LLC

(57) ABSTRACT

Techniques for GPS navigation used to determine the position and velocity of a moving object. Pseudorange (PR) measurements and accumulated delta range (ADR) measurements are made at the object from received GPS signals. Differences are computed between ADR measurements that are separated by a time interval that is greater than a time interval between consecutive ADR measurements. Navigational parameters (e.g., position, velocity and clock) are estimated from the PR measurements and the ADR differences. The ADR measurement equations set for herein are formulated in a much more accurate way so that the time interval between the ADR measurements used to compute an ADR difference can be much larger than that used for current ADR differencing techniques in GPS navigation applications. Consequently, the ADR differences are more accurate, which translates into a much more accurate navigation solution. In addition, the ADR differencing technique contributes to shorten convergence times of the Kalman filter processing, and thereby improve the accuracy of spacecraft navigation. Techniques are also provided to extend these highly accurate ADR processing algorithms to integrated GPS/IMU navigation applications, where IMU data is used as an accurate propagation model to propagate the state vector.

47 Claims, 11 Drawing Sheets

U.S. PATENT DOCUMENTS

| | | | |
|---|---|---|---|
| 5,899,957 A * | 5/1999 | Loomis | 701/214 |
| 6,009,376 A | 12/1999 | Brodie et al. | |
| 6,134,484 A * | 10/2000 | Geier et al. | 701/13 |
| 6,175,806 B1 | 1/2001 | Thuente | |
| 6,268,823 B1 | 7/2001 | Nelson, Jr. | |
| 6,420,999 B1 | 7/2002 | Vayanos | |
| 6,608,589 B1 | 8/2003 | Devereux et al. | |
| 6,622,091 B2 | 9/2003 | Perlmutter et al. | |
| 6,664,923 B1 | 12/2003 | Ford | |
| 2002/0021245 A1 * | 2/2002 | Lin et al. | 342/357.14 |
| 2003/0132878 A1 | 7/2003 | Devereux et al. | |

OTHER PUBLICATIONS

Braasch, et al., "GPS Receiver Architectures and Measurements," Proceedings of the IEEE, vol. 87, No. 1, Jan. 1999, pp. 48-64 (BNSDOCID# XP-002362516).

* cited by examiner

GPS ACCUMULATED DELTA RANGE PROCESSING FOR NAVIGATION APPLICATIONS

RELATED APPLICATION

This application claims priority to U.S. Provisional Application No. 60/610,609, filed Sep. 17, 2004, entitled "GPS ADR Processing for Navigation of a Spacecraft," the entirety of which is incorporated herein by reference.

FIELD OF THE INVENTION

The present invention relates to global positioning system (GPS) navigation technologies, and more particularly to navigation algorithms that use accumulated delta range (ADR) measurements for more accurate navigation results.

BACKGROUND OF THE INVENTION

GPS is a well established means of navigation for spacecraft, aircraft as well as Earth-based vehicles or persons. Typically, a user receives signals from GPS satellites and uses pseudorange (PR) measurements from data contained in the GPS signals to determine its position, velocity and other parameters. The term "user" refers to the object whose position is computed based on GPS or other ranging signals it receives. If an application requires high accuracy navigation, PR measurements are processed by a Kalman filter rather than by a point solution algorithm. A Kalman filter uses PR measurements and sophisticated propagation models to estimate the user position, velocity and other state vector parameters. Propagation models are designed to compute the state of the user at time N if the state is known at time N−1. They allow the Kalman filter to use the prior knowledge of the user state for computing the current estimate, thus improving the accuracy.

Unfortunately, even though propagation models can be quite accurate, this does not guarantee the accuracy of the propagated state. The propagation model uses the state vector estimate at the previous epoch as an input, and the accuracy of the latter may be a limiting factor. The accuracy of the propagated state is particularly vulnerable to errors in the object velocity estimate. Velocity is estimated indirectly by the Kalman filter due to its correlation with position.

Achieving high accuracy navigation is closely tied to estimating velocity accurately. This creates a circular dependence between position accuracy and the velocity accuracy. In practice, the estimation process is a gradual one, where improvements in accuracy of velocity and position facilitate each other over some time. The entire process is referred to as convergence of the Kalman filter. In a typical case, filter convergence for space applications takes from several hours to a day or even more. This may be a problem, especially after a spacecraft maneuver, when the filter has to re-converge.

There is room from improving the accuracy of GPS navigation processing, both in terms of the navigation solutions that are produced and the convergence time of the Kalman filter computations.

SUMMARY OF THE INVENTION

Briefly, techniques are provided for GPS navigation used to determine the position and velocity of a moving object. Pseudorange (PR) and accumulated delta range (ADR) measurements are made at the object from received GPS signals. Differences are computed between ADR measurements that are separated by a time interval that is greater than a time interval between consecutive ADR measurements. Navigational parameters (e.g., position, velocity and clock) are estimated from the PR measurements and the ADR differences.

One analogy to the techniques described herein is as follows. A person traveling in a car starts a stop watch as the car begins to travel. After some time interval, the person stops the stop watch and measures the distance that the car has traveled. Each time the stop watch is started and stopped, error is introduced. If a short time period is used to measure the distances, the estimate of the car speed will likely not be very accurate. Conversely, if the car moves at the constant speed, and if the person performs a measurement over a long period of time, the estimate of speed becomes much more accurate. While the second option is preferable, it is not always feasible since the assumption of the constant speed may be invalid. Moreover, measuring speed over a relatively long time interval produces the average speed over this time interval. The average speed is of little practical use, since most applications require knowledge of the current state.

This techniques described herein combine the advantage of measuring an object's velocity over relatively long time intervals with the ability to accurately map such measurements to instantaneous velocity at the time of processing. This is accomplished by processing differenced ADR measurements and by applying a mathematical formulation that accurately maps such differences to the current state vector of the user.

The ADR measurement equations set forth herein are formulated in a much more accurate way so that the time interval between the ADR measurements used to compute an ADR difference can be much larger than that used for current ADR differencing techniques in GPS navigation applications. Consequently, the ADR differences are more accurate, which translates into a much more accurate navigation solution. In addition, the ADR differencing technique contributes to shorten convergence times of the Kalman filter processing, and thereby improve the navigation accuracy.

The difficulty in using ADR measurements is that they relate to quantities which are accumulated/integrated over some time interval, whereas a Kalman filter requires instantaneous measurements. This difficulty is overcome with the techniques described herein by a mathematical formulation that accurately maps ADR measurements into instantaneous measurements. Moreover, such instantaneous measurements are primarily for velocity and therefore provide a direct means to estimate velocity of the object.

There are many benefits from using ADR measurements with the mathematical formulations described herein. Velocity estimates combined with a propagation model immediately results in a more accurate propagated state, which enables a dramatic reduction in the convergence time of the Kalman filter. Use of ADR measurements in addition to PR approximately doubles the total number of measurements used for processing. In addition, ADR measurements have much lower noise than PR measurements. More measurements and lower noise result in better overall accuracy.

Techniques are also provided to extend these highly accurate ADR processing algorithms to navigation applications where a reliable propagation model may not be available for a particular object movement. For example, accurate propagation models are not available for certain aircraft, land-vehicles, persons, etc. However, if these objects have the capability to make inertial measurements such as acceleration and rotation rate, the inertial measurements may be used to aid ADR difference processing.

DETAILED DESCRIPTION

Figure 1:
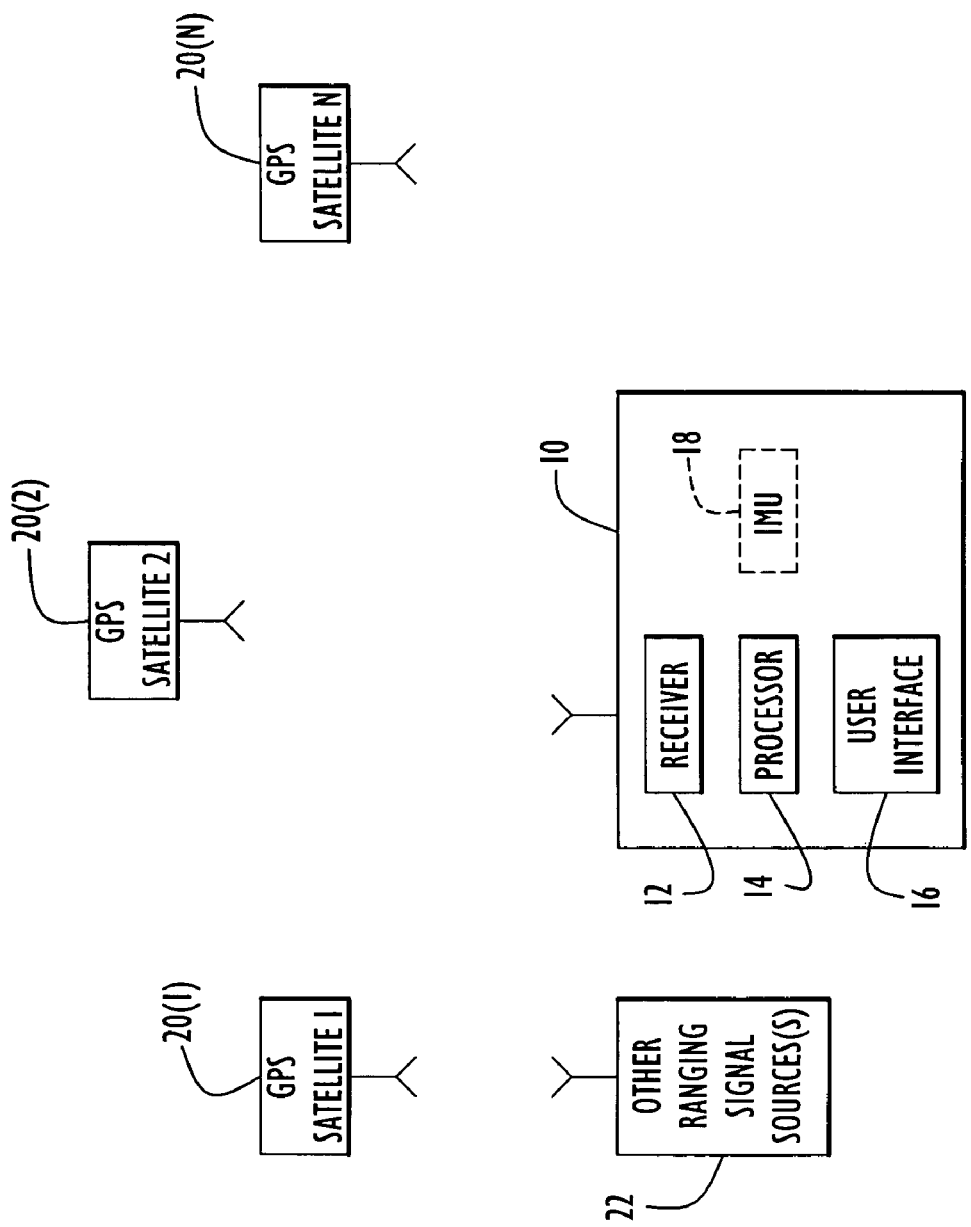
FIG. 1 is a block diagram of a navigation system including GPS satellites and navigation unit that resides in a moving object, and which uses PR and ADR measurements to compute navigation parameters based solely on GPS signals or based on GPS signals and IMU data.

FIG. 1 illustrates an environment where the navigational techniques described herein are useful. An object 10 is shown whose position is to be computed from signals received from a plurality global positioning system (GPS) satellites 20(1) to 20(N). The object 10 may be a spacecraft such as a satellite or space vehicle, earth land or air vehicle (e.g., car, truck, tank, airplane, helicopter, ship, etc.). The object 10 has a receiver 12 that is capable of receiving signals from the GPS satellites 20(1) to 20(N), a processor 14 that makes measurements from the received signals and computes the position, velocity, direction, etc., of the object, and a object interface 16 (such as a keyboard and display) to convey navigational information to a human, if desired. In addition, the object may include an inertial measurement unit (IMU) 18 that outputs measurement data for acceleration and rotation rate of the object. The processor 14 performs computations on measurements derived from the received GPS signals.

The receiver 14 makes pseudorange (PR) measurements and accumulated delta range (ADR) measurements from the received GPS signals. The processor 14 then makes Kalman filter computations on the PR and ADR measurements using measurement equations, and updates the state vector using propagation modeling computations or using the IMU data.

FIG. 1 also shows that while GPS satellites 20(1) to 20(N) are commonly used to determine position, there are other ranging sources that transmit ranging signals. Reference numeral 22 is intended to represent these other ranging sources, such as ground based systems or indoor position tracking systems. GPS signals are meant to be only an example of the type of ranging signals with which the techniques described herein may be employed.

A Kalman filter is an optimal linear estimator that estimates a state vector (e.g., position, velocity, and clock) from multiple measurements of various types (e.g., PR and ADR measurements). PR and ADR measurements are made from the received GPS signals on a repeated basis, where each measurement event is called an "epoch". The Kalman filer produces a minimum variance estimate in the least squares sense. In addition to the navigation state it generally estimates errors in the overall navigation state. The filter outputs a measure of the accuracy of its error state vector estimate. This measure of accuracy is represented by a covariance matrix, which is a matrix of second central moments of the errors in the state estimate.

Typically, a Kalman filter is applied in a cycle, where the algorithm alternates between processing available measurements (with a measurement model represented by measurement equations) and propagating the solution of the state vector to the next epoch (with a propagation model represented by propagation equations). The propagation model is a process that describes how the error state vector changes in time. The measurement model defines the relationship between the error state vector and any measurements processed by the filter. The accuracy of the solution depends on the quality and quantity of the measurements, on the accuracy of measurement equations, and on the accuracy of propagation routines. For nonlinear problems such as estimation of a satellite state, measurement equations are typically linearized.

Linearization includes computation of partial derivatives of the measured quantity with respect to the components of the state vector. Computation of such partial derivatives for PR measurements is straightforward, and is the foundation for conventional navigation algorithms. However, computation of partial derivatives for ADR measurements is more complex. The primary difficulty is the time mismatch: the state vector represents the satellite state at a particular time, whereas ADR measurements represent an accumulation of phase measurements over some time interval. One technique is to map ADR measurements from a time interval to a time instant. Such mapping will necessarily be an approximation and will introduce an error in the navigation solution, in addition errors from measurement noise.

Conceptually, the Kalman filter weights the relative contributions of the measurements and of the dynamic behavior of the state vector. The measurements and state vector are weighted by their respective covariances. If the measurements are inaccurate (large variances) when compared to the state vector estimate, then the filter deemphasizes the measurements. When the measurements are very accurate (small variances) when compared to the state vector estimate, the filter will weigh the measurements heavily such that its previously computed state estimate will contribute little to the latest state estimate.

Even a naïve approach to processing ADR data can yield measurement equations, which are more accurate than underlying ADR measurements (i.e., error in the measurement equations is smaller than the measurement noise). Yet the effect of a seemingly insignificant error in measurement equations on the navigation accuracy can be quite large. The reason for this is that this error is highly correlated in time and therefore not removed by filtering.

A danger from long-term correlated errors in measurement equations can be appreciated by examining similar effects for the propagation. Measurement processing and propagation are two stages of a Kalman filter algorithm, and are executed at each cycle. It is well known that small unaccounted acceleration errors in a propagation model may accumulate over time and affect the navigation accuracy. This effect has forced development of sophisticated and precise propagation models.

It is intuitively clear that similar effects must be true for measurement equations. Indeed, an error in the measurement equations would tend to "pull" the object (e.g., spacecraft) at each epoch at the update (data processing) stage of processing, and would have an effect similar to that from unmodeled acceleration at the propagation stage. The effect from such error on the navigation solution may be substantial. In this case, using measurements with long-term errors may be worse than not using ADR measurements at all. Thus, use of ADR measurements in navigation is highly dependent on the ability to map them to the state vector with no or little long-term correlated errors. This accuracy requirement can be quantified as follows: correlated errors in the measurement equations should be below or of the order of errors in the propagation equations. In this case, using measurement equations for ADR will be more likely to make the accuracy better.

This is definitely possible for relative navigation, e.g., satellite formation flying. Differencing and double differencing removes biases and allows for extraordinary accuracy in relative navigation solutions. However, it is less evident how to develop an accurate algorithm for applying ADR measurements for absolute navigation applications. This may be the reason for not using ADR measurements for absolute navigation of spacecraft in many previous applications.

An important aspect of the techniques described herein is a mathematical formulation, which enables accurate ADR measurement processing for absolute navigation of spacecraft. This ADR processing is complementary to, and used in conjunction with conventional PR processing. The primary distinguishing feature of the following algorithm to be described is its accuracy. The measurement equations contain unaccounted errors, but the magnitude of these errors is reduced to the same order as that of unmodeled propagation errors.

Figure 2:
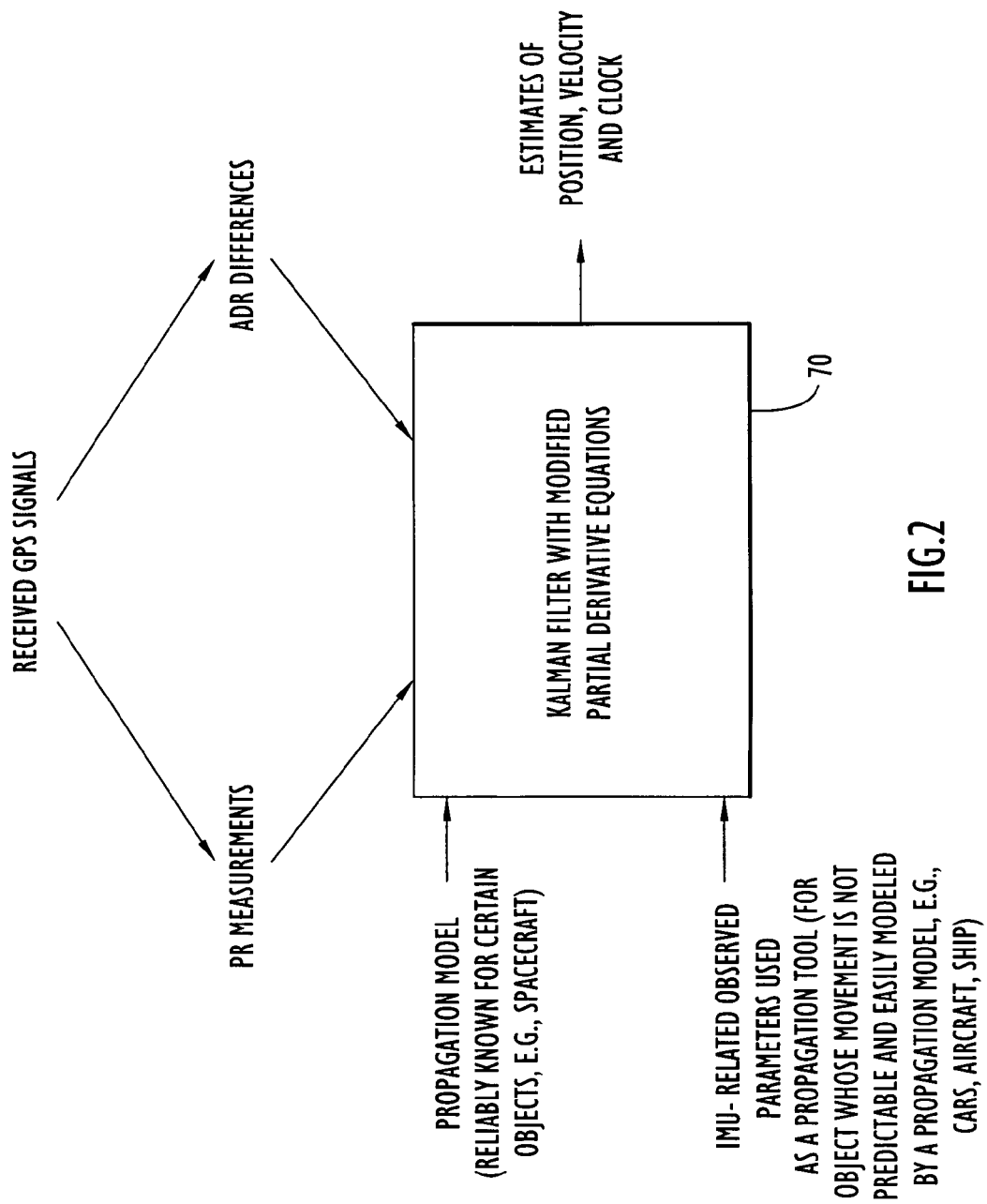
FIG. 2 is a diagram showing the measurements and parameters that are input into a Kalman filter for the navigation computations based on PR and ADR measurements.

With reference to FIG. 2, a high-level pictorial representation of the navigation processing is shown. The moving object uses the received GPS signals to derive PR measurements and ADR differences (from two ADR measurements separated in time) using techniques described below in conjunction with FIG. 3. The PR measurements and ADR differences are supplied to the Kalman filter represented by block 70. Also supplied to the Kalman filter are a propagation model, if known, for the object 10 and/or IMU data if the object 10 includes an IMU. The IMU data is useful in circumstances where integrated GPS-IMU navigation computations are to be performed, such as when a reliable propagation model is not known for the object 10.

Figure 3:
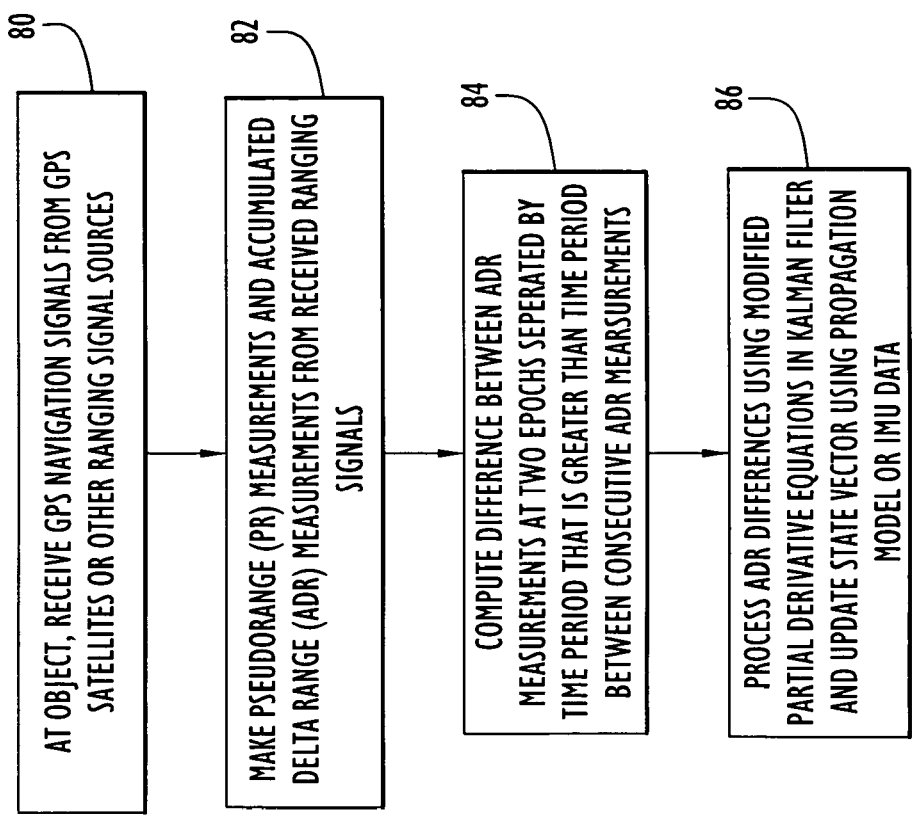
FIG. 3 is a flow chart showing the overall navigation computation process based on PR and ADR measurements.
Figure 5:
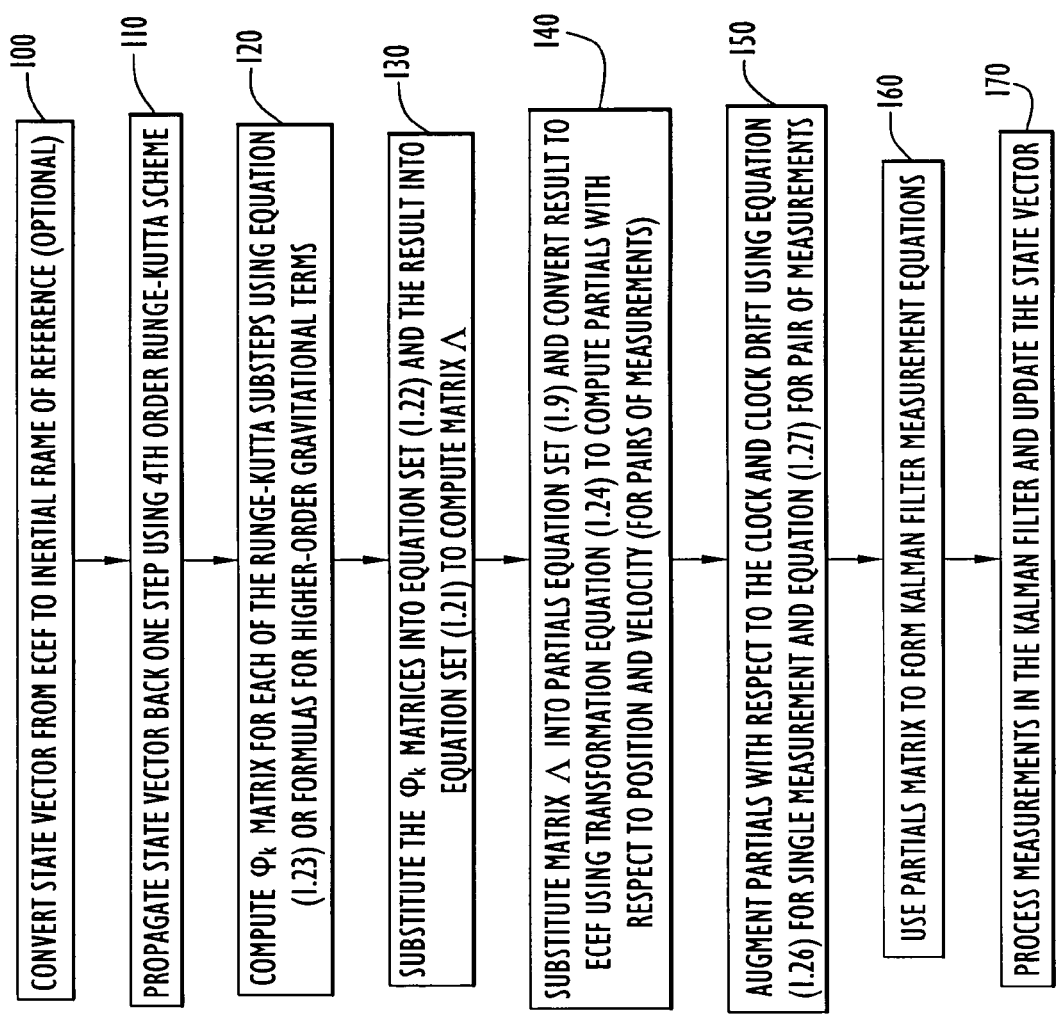
FIG. 5 is a flow chart showing the processing steps for the GPS-only navigation computations based on PR and ADR measurements.
Figure 6:
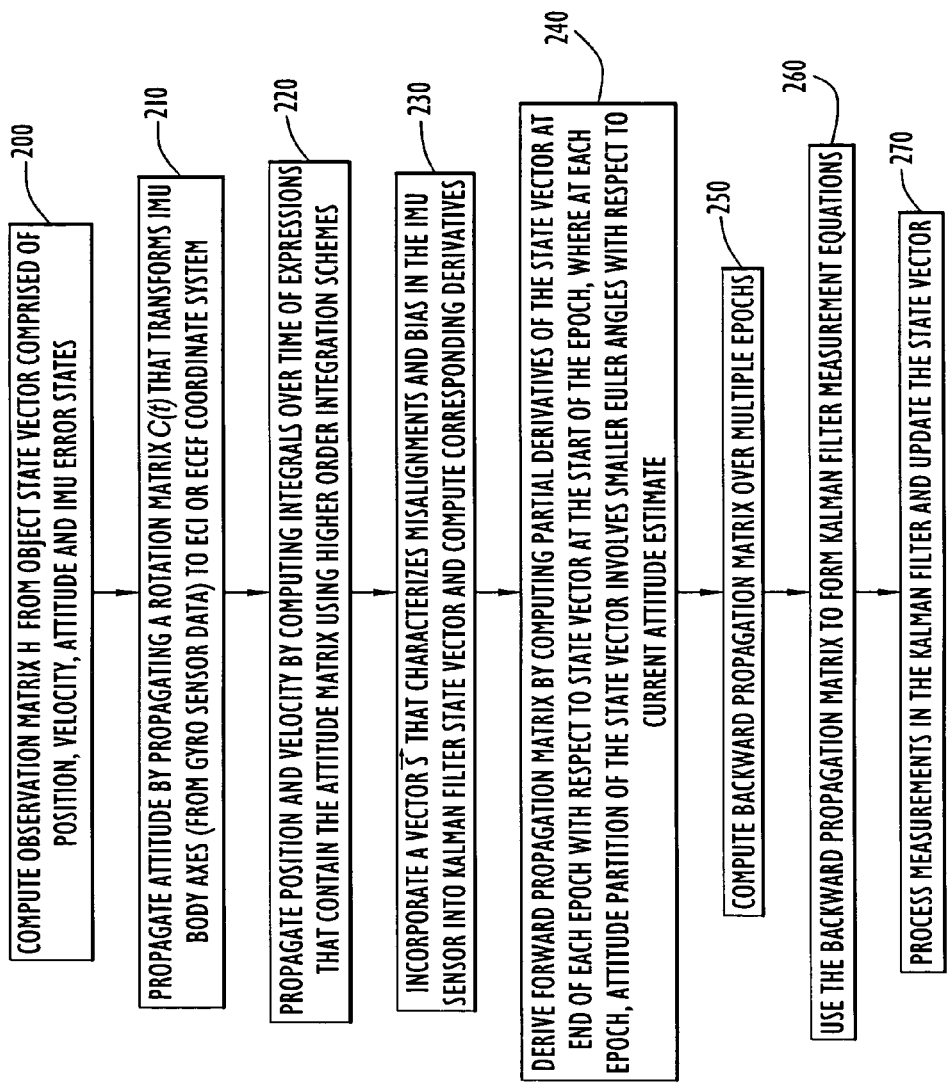
FIG. 6 is a flow chart showing the processing steps for using IMU data to propagate the state vector in for integrated GPS-IMU navigation computations.

Turning to FIG. 3, the basic steps for the GPS-only or GPS-IMU navigation algorithm will be described. In step 80, the object 10 receives ranging signals, such as GPS navigation signals from GPS satellites or ranging signals from other ranging sources as shown in FIG. 1. Next, in step 82 the object makes PR and ADR measurements from the ranging signals received in step 80. In step 84, a difference is computed between two ADR measurements at two epochs (e.g., time instants) that are separated by a time interval that is greater than a time interval between consecutive ADR measurements. This ADR differencing technique is described in more detail in conjunction with FIG. 4. In step 86, the ADR differences are processed using modified partial derivative equations in the Kalman filter, and the state vector is propagated either using the propagation model (and the PR measurements) or by propagating the state vector using IMU data obtained by the object. The modified partial derivative equations are described in more detail hereinafter in connection with FIG. 5. The techniques for propagating the state vector using the IMU data is described in conjunction with FIG. 6. Again, the techniques of FIG. 6 are useful in navigation applications where the object whose position is to be measured does not have a predictable acceleration and thus a reliable propagation model is not known.

I. ADR Measurement Processing Equations for GPS-Only and Integrated GPS-IMU Navigation A. Canceling Bias ADR data has an unknown constant bias (if there are no cycle slips). Due to this bias, ADR measurements cannot be applied in the same way as PR measurements. One well known method of dealing with the bias is estimating it, e.g. by using ADR to smooth PR measurements. A technique that is superior to smoothing is described herein for processing ADR measurements and eliminating the bias.

A general way to exclude bias is to use a measurement in the following form:

$$\bar{P} = \int_{t_1}^{t_2} P(t) \cdot W(t) dt \qquad (1.1)$$

where P(t) is the ADR measurement, and the weight function W(t) is selected in such way, that $$\int_{t_1}^{t_2} W(t) dt = 0.$$

One can verify by direct substitution that equation (1.1) cancels a constant bias contained in ADR measurement P(t). Weights W(t) can be selected to minimize errors in the resulting measurement $\bar{P}$ and to improve the results of its processing by the Kalman filter.

To illustrate the benefits of using equation (1.1), a special case of weighting function W(t) is considered, which yields simply a difference of ADR values $\bar{P}=\Delta P=P(t_n)-P(t_{n-1})$ at two epochs $t_{n-1}$, $t_n$. This is probably the simplest (though not the optimal) expression that cancels the bias, and it produces the following measurement:

$$\Delta P = \left[ (\vec{r}_n - \vec{r}_{s,n})^2 \right]^{\frac{1}{2}} - \left[ (\vec{r}_{n-1} - \vec{r}_{s,n-1})^2 \right]^{\frac{1}{2}} + \int_{t_{n-1}}^{t_n} \dot{\tau} dt \qquad (1.2)$$

where $\vec{r}_n$ is the position vector of the object, $\vec{r}_{s,n}$ is the position vector of a GPS satellite, $\dot{\tau}$ is the object clock drift, and subscripts n, n−1 denote two epochs (not necessarily consecutive). The nature of equation (1.2) is that of relative velocity between the object and the GPS satellite, integrated over some time interval. In known ADR processing techniques, the two time instances $t_{n-1}$, $t_n$ for which ADR values are differenced correspond to two consecutive epochs. By contrast, in the ADR processing techniques described herein, the quality of ADR measurement can be greatly improved if these two time instances are separated by a longer time interval. In a more general formulation, this corresponds to a wider range of t where weighting function W(t) is non-zero. The simpler case of using measurement equation (1.2) can bring substantial benefits. Further improvement may be possible by using measurement in the form of formula (1.1).

B. Choosing the Time Interval Between ADR Measurements for the ADR Difference Computation Equation (1.2) does not specify the duration of the time interval between the two epochs for which the ADR difference computation is made. Choice of the duration of this time interval is very important for reaching the full potential of the method suggested below.

Based on the qualitative considerations presented above, the basic, rough form of velocity estimate derived from two ADR measurements is:

$$V = \frac{P(t_n) - P(t_{n-1})}{t_{n-1} - t_n} \quad (1.3)$$

The following description specifies the measurement equation to be used in the Kalman filter. For the purposes of this description, it is necessary only to know that the propagation model will be used to formulate it, and errors in the propagation model will contribute to the errors in the velocity estimate along with the measurement noise in ADR measurements. Thus, extending the time interval between ADR measurements for computing an ADR difference is dependent on the accuracy of the propagation model. A more accurate propagation model will allow for a longer time interval between ADR measurements for computing the ADR difference. Similarly, more accurate IMU data and use of IMU data for propagation purposes (as described hereinafter in conjunction with FIG. 6), will allow for a longer time interval between ADR measurements for the difference computation.

Errors in the propagation model $\delta \hat{P}$ are assumed to be due to unmodeled accelerations, and can be estimated as follows:

$$\delta \hat{P} \approx \frac{1}{2} \delta a \cdot (t_n - t_{n-1})^2 \quad (1.4)$$

where $\delta a$ is the unmodeled acceleration. The measurement noise in the two ADR measurements are accounted for and are assumed to be not correlated. Their variances are assumed to be equal and are denoted by $\sigma_P^2$ The total variance of the velocity estimate error can be approximated as follows:

$$\sigma_V^2 = \frac{2\sigma_P^2 + \frac{1}{4} \delta a^2 \cdot (t_{n-1} - t_n)^4}{(t_{n-1} - t_n)^2} \quad (1.5)$$

It is straightforward to find the minimum of this variance with respect to the duration of the time interval. This defines the optimal duration to be used in applying this techniques described herein:

$$(t_{n-1} - t_n)_{opt} = 2^{\frac{3}{4}} \cdot \left(\frac{\sigma}{|\delta a|}\right)^{\frac{1}{2}}$$

If the quality of the propagation model is such that unmodeled accelerations are of the order of $|=a|\approx 10^{-6}$ m/s$^2$ and if the ADR noise is of the order of $10^{-2}$ m, then the optimal duration of the interval between the two epochs for which the ADR difference computation is made is on the order of 100 s, where each epoch is approximately 1 sec.

Figure 4:
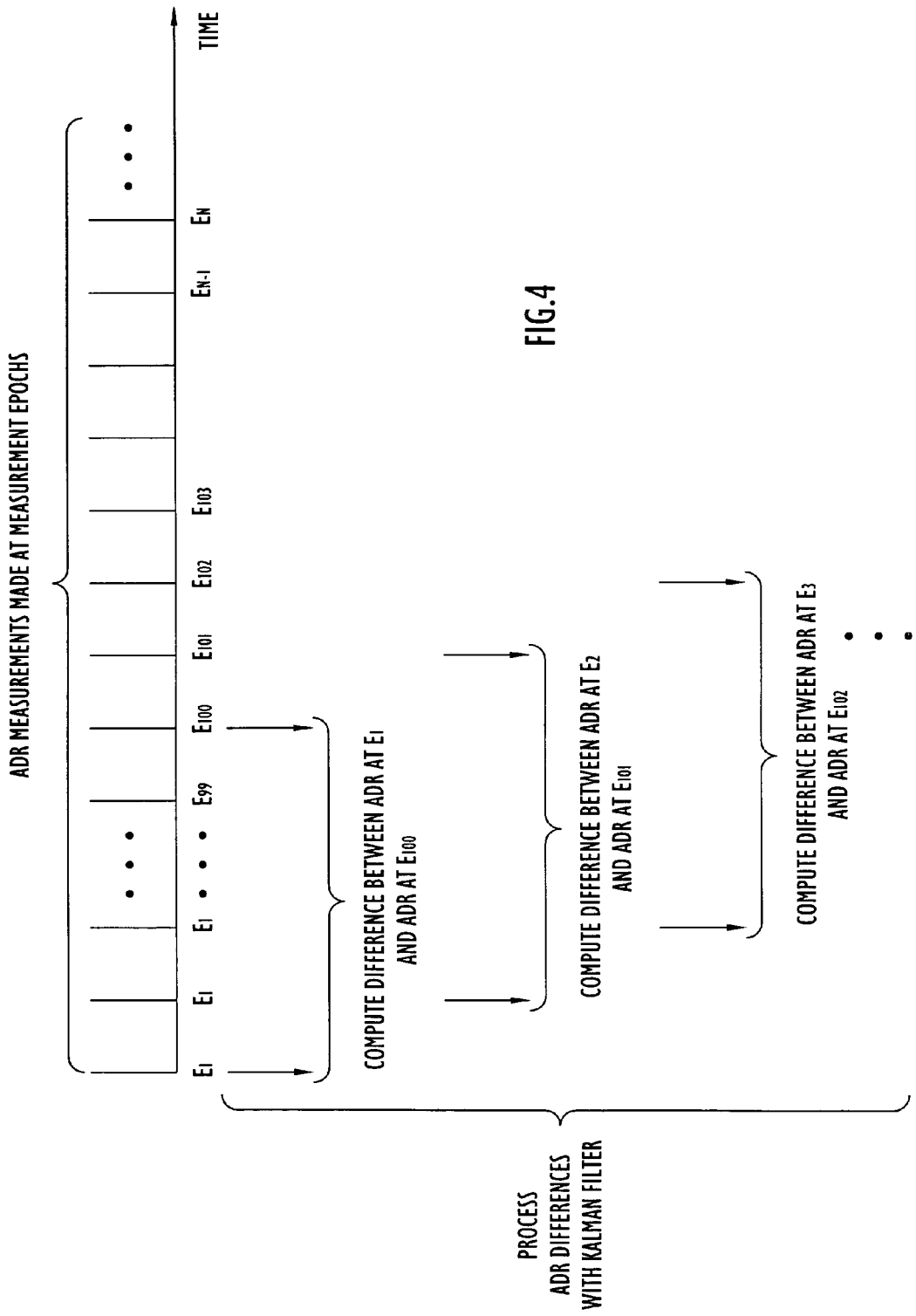
FIG. 4 is a diagram that pictorially represents how ADR differences are computed from two ADR measurements separated in time by multiple epochs.

With reference to FIG. 4, an example is shown to illustrate how ADR differences are computed. Whereas current GPS navigation techniques compute a difference between consecutive ADR measurements, it has been found that computing a difference between ADR measurements separated by a time interval that is greater, and particularly substantially greater, than the time interval between ADR measurements, can produce much more accurate navigation solutions, and assist in the Kalman filter converging faster. For example, FIG. 4 shows that an ADR difference is computed between an ADR measurement at epoch $E_1$ and an ADR measurement at epoch $E_{100}$ (where each epoch is approximately 1 sec apart), between an ADR measurement at epoch $E_2$ and an ADR measurement at epoch $E_{101}$, between an ADR measurement at epoch $E_3$ and an ADR measurement at epoch $E_{102}$, and so on. Thus, with this example, ADR differences are computed for each new ADR measurement as it is received.

It is not necessary that an ADR difference be computed for each new ADR measurement with respect to a prior ADR measurement many epochs preceding it. ADR differences can be computed between ADR measurements, separated by a suitable period of time (e.g., number of epochs) that do not necessarily using each and every ADR measurement that is made. For example, an ADR difference can be computed between an ADR measurement at epoch $E_1$ and an ADR measurement at epoch $E_{100}$, and ADR measurement at epoch $E_{101}$ and an ADR measurement at epoch $E_{200}$, and so on. Still another possibility is to compute an ADR difference between epoch $E_1$ and an ADR measurement at epoch $E_{100}$, between epoch $E_{10}$ and an ADR measurement at epoch $E_{111}$, between epoch $E_2$ and an ADR measurement at epoch $E_{121}$, etc. These ADR differences are processed using modified partial derivative equations described below.

Note that both small (e.g., 1 s) or very large (e.g. 10$^4$ s) time intervals would result in larger errors in the velocity estimate. For the optimal duration, errors in the velocity estimate can be estimated by substituting the optimal value for duration in equation (2), to yield:

$$\sigma_{V_{opt}} \approx 10^{-4} \text{ m/s} \quad (1.6)$$

This estimate for error is small compared to other means of estimating velocity. It is particularly impressive as a result of processing a single measurement. Of course, the potential for obtaining such high-quality measurements can only be realized using measurement equations with a comparable accuracy. The following sections present a derivation for the measurement equations that are useful for processing ADR differences computed as described above.

C. Mitigating Object Clock Errors

The following derivation assumes that a good propagation model is available for the object position and velocity (i.e., position and velocity of object 10), which is typically the case for satellite objects. Unfortunately, the propagation model for the clock may be less accurate (if an inexpensive clock is used), and therefore the last term in equation (1.2) is difficult to estimate accurately. If partials are computed for the right-hand side of equation (1.2), a dominant one would be due to the clock drift, and it may create problems for accurate estimation of other components of the state vector (mainly, velocity).

In Kalman filter processing of ADR measurements, the estimation of the clock drift is separated from the estimation of velocity. Totally clean separation is neither feasible nor necessary; the goal is to be able to estimate velocity in the presence of an unstable clock. We observe that the last term in equation (1.2) has the same value for all satellites in view, and thus can be canceled by differencing measurements. Thus, the measurement residual for a satellite pair (p, q) to be used in the Kalman filter is as follows:

$$\Delta P_p - \left[(\vec{r}_n - \vec{r}_{sp,n})^2\right]^{\frac{1}{2}} + \left[(\vec{r}_{n-1} - \vec{r}_{sp,n-1})^2\right]^{\frac{1}{2}} - \qquad (1.7)$$

$$\Delta P_q + \left[(\vec{r}_n - \vec{r}_{sq,n})^2\right]^{\frac{1}{2}} - \left[(\vec{r}_{n-1} - \vec{r}_{sq,n-1})^2\right]^{\frac{1}{2}}$$

This residual can be readily computed from available ADR measurements and from known or estimated positions of GPS satellites and the object.

The measurement residual in the form of expression (1.7) can be used to estimate velocity. For the clock drift, we use any one of the single measurements in the form given by equation (1.2).

To use a measurement in the Kalman filter, the partials matrix must be computed. The challenge in computing the partials matrix is that an instantaneous measurement model is needed, whereas equation (1.2) is for velocity integrated over a period of time. This difficulty is overcome by the processing methodology described below in conjunction with the flow chart of FIG. 5. The goal of the processing steps shown in FIG. 5 and described below is to compute derivatives of the ADR differences with respect to one or more components at the current time of the state vector (e.g., the state vector velocity and position components) to produce instantaneous velocity estimates that are used to update the velocity component of the state vector. The PR measurements are also processed in the Kalman filter to update the position component, and a known propagation model or IMU data (as described hereinafter in conjunction with FIG. 6) is used to propagate the state vector. These techniques, as will become apparent hereinafter, have higher-order accuracy than prior art GPS navigation techniques with respect to the time separation between ADR measurements, e.g. the error is ~x⁴, where x is a small parameter proportional to the time difference between measurements, compared to the error ~x of prior art navigation techniques.

This method comprises computing partial derivatives of the object position at the past epoch with respect to the state vector at the current epoch. This computation is a higher-order approximation (e.g., $4^{th}$ order) with respect the time difference between epochs, using the propagation model as an underlying engine.

D. Partials with Respect to Position and Velocity in the Inertial Frame of Reference Since equation (1.2) is a scalar, it can be formulated using any frame of reference. In this subsection, an inertial frame of reference is used. To compute partials in Earth-fixed frame (ECEF), they are first computed in the inertial frame, which is defined as having the same axis orientation as the ECEF frame at epoch n. The results will be used later to compute partials in the ECEF frame.

To keep equations less cumbersome, partials are obtained using equation (1.2) that correspond to one of the satellites in the pair, i.e. compute:

$$\frac{\partial \left\{ \left[(\vec{r}_n - \vec{r}_{s,n})^2\right]^{\frac{1}{2}} - \left[(\vec{r}_{n-1} - \vec{r}_{s,n-1})^2\right]^{\frac{1}{2}} \right\}}{\partial \vec{X}} \qquad (1.8)$$

where $\vec{X}$ is the object state vector comprising position, velocity, clock, and clock drift of the object.

Thus, in step 100, the state vector may be converted from the ECEF frame of reference to an inertial frame of reference. Computation 100 is optional. Transformation to and from the ECEF frame is optional.

Partial derivatives in expression (1.8) are computed only with respect to position and velocity components of the state vector at epoch n. This partition of the state vector is denoted as $\vec{x}_n = \{\vec{r}_n, \vec{v}_n\}$. Partials with respect to clock and clock drift are computed separately.

Since object position $\vec{r}_n$ is explicitly used in expression (1.8), it creates an impression that it is necessary only to compute partials with respect to it. However, object position $\vec{r}_n$ is the result of the state vector propagation from epoch n−1. Thus, $\vec{r}_n$ is a function of $\vec{x}_{n-1}$; hence $\vec{x}_{n-1}$ is an (inverse) function of $\vec{r}_n$, and $\vec{r}_{n-1}$ (being a part of $\vec{x}_{n-1}$) is a function of $\vec{r}_n$. This results in a more complex computation of the derivatives:

$$\frac{\partial}{\partial \vec{x}_n} \left\{ \begin{array}{l} \left[(\vec{r}_n - \vec{r}_{s,n})^2\right]^{\frac{1}{2}} - \\ \left[(\vec{r}_{n-1} - \vec{r}_{s,n-1})^2\right]^{\frac{1}{2}} \end{array} \right\} = \frac{\chi(\vec{x}_n - \vec{x}_{s,n})}{\left[(\vec{r}_n - \vec{r}_{s,n})^2\right]^{\frac{1}{2}}} - \qquad (1.9)$$

$$\frac{\left[\Lambda^T(\vec{r}_{n-1} - \vec{r}_{s,n-1})\right]}{\left[(\vec{r}_{n-1} - \vec{r}_{s,n-1})^2\right]^{\frac{1}{2}}}$$

where $$\Lambda_{ij} = \frac{\partial r_{n-1,i}}{\partial x_{n,j}} \qquad (1.10)$$

and χ is a 6×6 matrix, which contains all zeroes, except for the first three elements of the main diagonal, which are equal to 1. The right-hand side of equation (1.9) is a partition of the partials matrix, which can be used in the Kalman filter for measurement processing.

In equation (1.9), the matrix Λ is used. As it was explained above, this matrix is due to dependence between state vectors at two epochs, which in turn is due to propagation of the state vector.

II. Further ADR Processing

A. GPS-Only Navigation

To propagate a state vector, all components of the state vector are needed. If the velocity component is lacking, propagation cannot be done. Note that matrix Λ uses position only at epoch n−1 and both position and velocity at epoch n. This makes it necessary to propagate backwards, i.e. from epoch n to epoch n−1, or in other words over a time interval separating the ADR measurements for which the differences are computed.

Thus, in step 110, the state vector is propagated back one step using a propagation routine, such as the Runge-Kutta scheme. Propagation is governed by ordinary differential equations. Many propagation routines use the so called "Runge-Kutta" scheme to ensure high accuracy. When computing matrix Λ, a high level of accuracy is maintained by using a $4^{th}$ order Runge-Kutta method for the underlying propagation algorithm. This propagation algorithm does not have to match exactly the one used for propagating the state vector (there are several equally good Runge-Kutta schemes). An example of a useful Runge-Kutta scheme is represented by the following equation set:

$$\frac{d\vec{x}}{dt} = \vec{f}(t, \vec{x}) \quad (1.11)$$

$$\vec{x}_{n+1} = \vec{x}_n + \frac{1}{6}(\vec{k}_1 + 2\vec{k}_2 + 2\vec{k}_3 + \vec{k}_4)$$

$$\vec{k}_1 = h \cdot \vec{f}(t_n, \vec{x}_n)$$

$$\vec{k}_2 = h \cdot \vec{f}\left(t_n + \frac{1}{2}h, \vec{x}_n + \frac{1}{2}\vec{k}_1\right)$$

$$\vec{k}_3 = h \cdot \vec{f}\left(t_n + \frac{1}{2}h, \vec{x}_n + \frac{1}{2}\vec{k}_2\right)$$

$$\vec{k}_4 = h \cdot \vec{f}(t_n + h, \vec{x}_n + \vec{k}_3)$$

where h is the step of the propagation. The set of equations in (1.11) is written in a canonical form, i.e. when equations are propagated from epoch n to epoch n+1. Since it is necessary to propagate in the opposite direction, h is replaced with (−h) in equation set (1.11).

To compute matrix Λ the partial derivatives $$\frac{\partial x_{n+1,i}}{\partial x_{n,j}}$$

are computed:

$$\frac{\partial x_{n+1,i}}{\partial x_{n,j}} = \delta_{ij} + \frac{1}{6}\left(\frac{\partial k_{1,i}}{\partial x_{n,j}} + 2\frac{\partial k_{2,i}}{\partial x_{n,j}} + 2\frac{\partial k_{3,i}}{\partial x_{n,j}} + \frac{\partial k_{4,i}}{\partial x_{n,j}}\right) \quad (1.12)$$

where $\delta_{ij}$ is the Kronecker delta function, and $$\frac{\partial k_{1,i}}{\partial x_{n,j}} = h \cdot \frac{\partial f_i(t_n, \vec{x}_n)}{\partial x_{n,j}} \quad (1.13)$$

$$\frac{\partial k_{2,i}}{\partial x_{n,j}} = h \cdot \frac{\partial f_i\left(t_n + \frac{1}{2}h, \vec{x}_n + \frac{1}{2}\vec{k}_1\right)}{\partial x_{n,j}}$$

$$\frac{\partial k_{3,i}}{\partial x_{n,j}} = h \cdot \frac{\partial f_i\left(t_n + \frac{1}{2}h, \vec{x}_n + \frac{1}{2}\vec{k}_2\right)}{\partial x_{n,j}}$$

$$\frac{\partial k_{4,i}}{\partial x_{n,j}} = h \cdot \frac{\partial f_i(t_n + h, \vec{x}_n + \vec{k}_3)}{\partial x_{n,j}}$$

For brevity the following notations are introduced:

$$\Psi_{ij}(t_n, \vec{x}_n) = \frac{\partial f_i(t_n, \vec{x}_n)}{\partial x_{n,j}} \quad (1.14)$$

$$\Psi_{1,ij} \equiv \Psi_{ij}(t_n, \vec{x}_n)$$

$$\Psi_{2,ij} = \Psi_{ij}\left(t_n + \frac{1}{2}h, \vec{x}_n + \frac{1}{2}\vec{k}_1\right)$$

$$\Psi_{3,ij} = \Psi_{ij}\left(t_n + \frac{1}{2}h, \vec{x}_n + \frac{1}{2}\vec{k}_2\right)$$

$$\Psi_{4,ij} = \Psi_{ij}(t_n + h, \vec{x}_n + \vec{k}_3)$$

Substitution of equation set (1.4) into equation set (1.13) and computation of partial derivatives yields the following:

$$\frac{\partial k_{1,i}}{\partial x_{n,j}} = h \cdot \Psi_{1,ij} \quad (1.15)$$

$$\frac{\partial k_{2,i}}{\partial x_{n,j}} = h \cdot \sum_q \Psi_{2,iq} \cdot \left(\delta_{qj} + \frac{1}{2}\frac{\partial k_{1,q}}{\partial x_{n,j}}\right)$$

$$\frac{\partial k_{3,i}}{\partial x_{n,j}} = h \cdot \sum_p \Psi_{3,ip} \cdot \left(\delta_{pj} + \frac{1}{2}\frac{\partial k_{2,p}}{\partial x_{n,j}}\right)$$

$$\frac{\partial k_{4,i}}{\partial x_{n,j}} = h \cdot \sum_m \Psi_{4,im} \cdot \left(\delta_{mj} + \frac{\partial k_{3,m}}{\partial x_{n,j}}\right)$$

Substituting $$\frac{\partial k_{1,i}}{\partial x_{n,j}}$$

from the first equation of equation set (1.15) into the second one, and continuing such chain substitutions until the last equation, derivatives of k with respect to $x_n$ are obtained, which are expressed through matrices $\Psi_{1-4}$. Then, all of these equations are substituted into equation (1.12) to obtain the following:

$$\frac{\partial x_{n+1,i}}{\partial x_{n,j}} = \delta_{ij} + \frac{1}{6}\Big(h\Psi_1 + 2h\Psi_2 + 2h\Psi_3 + \Psi_4 + h^2\Psi_2\Psi_1 + \quad (1.16)$$

$$h^2\Psi_3\Psi_2 + h^2\Psi_4\Psi_3 + \frac{1}{2}h^3\Psi_3\Psi_2\Psi_1 + \frac{1}{2}h^3\Psi_4\Psi_3\Psi_2 +$$

$$\frac{1}{4}h^4\Psi_4\Psi_3\Psi_2\Psi_1\Big)_{ij}$$

This is a cumbersome formula containing multiple products of 6×6 matrices. Fortunately, a considerable simplification can be made due to the special form of the Ψ matrices.

Note that $x_{n+1}$, $x_n$ in equation (1.16) correspond to $r_{n-1,i}$, $x_{n,j}$ in equation (1.9). Vector $\vec{r}_{n-1}$ is expressed in the inertial reference system. Moreover, it is assumed that the object motion in orbit is primarily due to a potential gravitational field U(t,x). This means that function $\vec{f}(t, \vec{x})$ in the first equation of set (1.11) has the following form:

$$\vec{f}_r = (t, \vec{x}) = \vec{v} \qquad (1.17)$$

$$\vec{f}_v(t, \vec{x}) = \frac{\partial U(t, \vec{r})}{\partial \vec{r}}$$

i.e., the first three components of $\vec{f}(t, \vec{x})$ (which are responsible for derivatives of the position) are simply those of velocity, and the last three components (which are responsible for derivatives of the velocity) are functions of the position only. This fact is used to simplify the right-hand side of equation (16).

Derivatives of $\vec{f}(t, \vec{x})$ (as needed for equation set (1.14)) are as follows:

$$\Psi = \left( \begin{array}{c|c} \hat{0} & I \\ \hline \varphi & \hat{0} \end{array} \right) \qquad (1.18)$$

where $\hat{0}$ is a zero 3×3 matrix, I is the identity 3×3 matrix, and $\varphi$ is a 3×3 matrix defined as follows:

$$\varphi_{ij} = \frac{\partial^2 U(t, x)}{\partial x_i \partial x_j} \qquad (1.19)$$

Products of $\Psi$ matrices now can be simplified:

$$\Psi_b \Psi_a = \left( \begin{array}{c|c} \varphi_a & \hat{0} \\ \hline \hat{0} & \varphi_b \end{array} \right) \qquad (1.20)$$

$$\Psi_c \Psi_b \Psi_a = \left( \begin{array}{c|c} \hat{0} & \varphi_b \\ \hline \varphi_c \varphi_a & \hat{0} \end{array} \right)$$

$$\Psi_d \Psi_c \Psi_b \Psi_a = \left( \begin{array}{c|c} \varphi_c \varphi_a & \hat{0} \\ \hline \hat{0} & \varphi_d \varphi_b \end{array} \right)$$

where subscripts a, b, c, d take values 1 through 4. Substitution of equation (1.20) into equation (1.16) yields the following expression:

$$\frac{\partial \vec{x}_{n+1}}{\partial \vec{x}_n} = I + \frac{1}{6} \left( \begin{array}{c|c} \Phi_{rr} & \Phi_{rv} \\ \hline \Phi_{vr} & \Phi_{vv} \end{array} \right) \qquad (1.21)$$

where the $\Phi$ matrices have dimensions 3×3 and are defined as follows:

$$\Phi_{rr} = h^2 \varphi_1 + h^2 \varphi_2 + h^2 \varphi_3 + \frac{1}{4} h^4 \varphi_3 \varphi_1 \qquad (1.22)$$

$$\Phi_{rv} = 6hI + \frac{1}{2} h^3 \varphi_2 + \frac{1}{2} h^3 \varphi_3$$

$$\Phi_{vr} = h\varphi_1 + 2h\varphi_2 + 2h\varphi_3 + h\varphi_4 + \frac{1}{2} h^3 \varphi_3 \varphi_1 + \frac{1}{2} h^3 \varphi_4 \varphi_2$$

-continued $$\Phi_{vv} = h^2 \varphi_2 + h^2 \varphi_3 + h^2 \varphi_4 + \frac{1}{4} h^4 \varphi_4 \varphi_3$$

Matrix $$\frac{\partial \vec{x}_{n+1}}{\partial \vec{x}_n}$$

in equation (1.21) contains products of no more than pairs of 3×3 matrices, compared with the original expression in equation (1.16), which contained products of up to four 6×6 matrices. Note that the dimension of matrix $\Lambda$ is 6×3, and therefore only two of the four 3×3 matrices are needed in the right-hand side of equation (1.21).

Rough estimates presented in one of previous sections show that the time interval between the two epochs associated with the ADR difference computation can be quite long. Even though partial derivatives (1.21) are computed to the fourth-order accuracy with respect to h, the accuracy of the result may not be sufficient for long time intervals. A natural solution to improve the accuracy would be to employ several substeps, and to compute partial derivative (1.21) as a product of matrices, which correspond to these substeps.

The $\varphi_k$ matrices are key to computing equation (1.21). They can be computed in the case of a J2 gravitational potential:

$$\varphi_{ji} = \frac{3\mu r_i r_j}{r^5} - \frac{\mu \delta_{ij}}{r^3} - \frac{\mu J_2 R_E^2}{2} \cdot \qquad (1.23)$$

$$\left[ -\frac{30(\vec{r} \cdot \vec{n}) \cdot (n_i r_j + n_j r_i)}{r^7} + \frac{6 n_i n_j}{r^5} - \frac{15 r_i r_j}{r^7} + \frac{105 (\vec{r} \cdot \vec{n})^2 r_i r_j}{r^9} + \frac{3\delta_{ij}}{r^5} - \frac{15 (\vec{r} \cdot \vec{n})^2 \delta_{ij}}{r^7} \right]$$

where n={$n_i$} is the unit vector in the z direction, r=|$\vec{r}$|, and $R_E$ is the Earth's radius.

A propagation model often includes effects other than the Earth gravitational field. Some of these effects cause (object) spacecraft acceleration, which is a function of the spacecraft position only, e.g. acceleration due to Sun and Moon, and solar radiation pressure. In this case, derivation of partials for ADR processing is analogous to that above. In some other effects (e.g., atmospheric drag), the acceleration is a function of both position and velocity. In this case, one either does not do a simplification in equations and use the full form (1.16), or treat such effects as a perturbation with a lower order accuracy.

Thus, in step 120, the $\varphi_k$ matrix is computed for each of the Runge-Kata substeps using equation (1.23), or formulas for higher-order gravitational terms beyond J2, which are provided separately below. After the $\varphi_k$ matrices are computed, in step 130 they are substituted into the equation set (1.22), and the results of equation set (1.22) are used in equation set (1.21) to compute the matrix $\Lambda$.

The matrix $\Lambda$ is substituted into the partials equation (1.9).

1. Partials with Respect to Position and Velocity in the Earth-Fixed Frame of Reference The previous subsection presents computation of partials in an inertial frame of reference. Since satellite positions and higher-order gravitational terms are available in the ECEF, it is necessary to compute partials in this frame. Since equation (1.9) can be directly applied to compute partials with respect to position and velocity of the object in the inertial frame, in step 140, the result of the computation in equation (1.9) is converted to ECEF using the transformation equation (1.24) below to compute partials with respect to position and velocity (for pairs of measurements).

To convert the result to ECEF, the following formula is used:

$$\frac{\partial \Delta P}{\partial x_{n,i}^E} = \sum_{j=1}^{6} \frac{\partial x_{n,j}^I}{\partial x_{n,i}^E} \cdot \frac{\partial \Delta P}{\partial x_{n,j}^I} \quad (1.24)$$

where $x_{n,i}^E$ is the i-th component of the position and velocity vector in the ECEF frame at epoch n, and $x_{n,j}^I$ is the j-th component of the same vector in the inertial frame. The element $$J_{ji} = \frac{\partial x_{n,j}^I}{\partial x_{n,i}^E}$$

in the Jacobian matrix J can be computed explicitly so that:

$$J = \begin{pmatrix} I & 0 \\ \vartheta & I \end{pmatrix} \quad (1.25)$$

where $\vartheta = [[\vec{\omega}]]$, $\vec{\omega}$ is the vector of the Earth's angular velocity, and $[[\vec{\omega}]]$ is the 3×3 skew-symmetric matrix formed from $\vec{\omega}$.

It is noted that the partials are computed first in the inertial frame. This is due to the special form of the $\Psi$ matrix in the inertial frame in equation (1.18), which greatly simplifies the result, and makes it more economical to compute partials in the inertial frame first, and then to convert them to ECEF using equation (1.24). However, this is not a requirement, but only a convenience.

2. Partials with Respect to the Clock and Clock Drift

Some spacecraft implementations use a clock with relatively low stability. Thus, estimation of the clock error and, preferably, clock drift is necessary. In step 150, partials computed above with respect to position and velocity are augmented with partials with respect to clock and clock drift as now described.

This begins by estimating the clock drift. One of the ADR measurements in the form given by equation (1.2) is used and its derivative is taken with respect to the clock error and clock drift. The drift is assumed to be constant during the time interval between epochs n−1 and n. This produces the following partials:

$$\frac{\partial \Delta P}{\partial \tau} = \frac{\partial}{\partial \tau}\left\{[(\vec{r}_n - \vec{r}_{s,n})^2]^{\frac{1}{2}} - [(\vec{r}_{n-1} - \vec{r}_{s,n-1})^2]^{\frac{1}{2}}\right\} \quad (1.26)$$

-continued $$\frac{\partial \Delta P}{\partial \dot{\tau}} = h + \frac{\partial}{\partial \dot{\tau}}\left\{[(\vec{r}_n - \vec{r}_{s,n})^2]^{\frac{1}{2}} - [(\vec{r}_{n-1} - \vec{r}_{s,n-1})^2]^{\frac{1}{2}}\right\}$$

where h is the time difference between epochs, and is by far the largest term. Thus, processing this measurement updates primarily the value of the clock drift. This update may be not very accurate if a good propagation model is not available for the clock (in one model, drift is assumed constant between epochs). Inaccuracies in estimating the clock drift will make this measurement all but useless for estimating velocity. To estimate velocity, we need a differenced measurement.

Computation of partials to estimate object velocity from difference measurements was presented above; however, not all partials have been computed. Namely, partials of the differenced measurements with respect to the object clock and clock drift remain to be derived.

The numerator of equation (1.8) does not contain the clock error or drift explicitly, yet there is an implicit dependence. The clock error at epoch n is assumed to be $\tau$, and the clock drift is $\dot{\tau}$. This means that the n-th epoch measurement was taken at a time, which differs by $-\tau$ from the integer second, and the (n−1)-th epoch measurement was taken at a time, which differs by $-\tau + \dot{\tau} \cdot h$ from the integer second. Since any changes in $\tau$ and $\dot{\tau}$ affect the time of the snapshot, they also affect the measured ADR. Computation of corresponding partial derivatives yields the following formulas:

$$\frac{\partial \left\{[(\vec{r}_n - \vec{r}_{s,n})^2]^{\frac{1}{2}} - [(\vec{r}_{n-1} - \vec{r}_{s,n-1})^2]^{\frac{1}{2}}\right\}}{\partial \tau} = -\frac{(\vec{v}_n - \vec{v}_{s,n}) \cdot (\vec{r}_n - \vec{r}_{s,n})}{[(\vec{r}_n - \vec{r}_{s,n})^2]^{\frac{1}{2}}} + \frac{(\vec{v}_{n-1} - \vec{v}_{s,n-1}) \cdot (\vec{r}_{n-1} - \vec{r}_{s,n-1})}{[(\vec{r}_{n-1} - \vec{r}_{s,n-1})^2]^{\frac{1}{2}}}$$

$$\frac{\partial \left\{[(\vec{r}_n - \vec{r}_{s,n})^2]^{\frac{1}{2}} - [(\vec{r}_{n-1} - \vec{r}_{s,n-1})^2]^{\frac{1}{2}}\right\}}{\partial \dot{\tau}} = -\frac{(\vec{v}_{n-1} - \vec{v}_{s,n-1}) \cdot (\vec{r}_{n-1} - \vec{r}_{s,n-1})}{[(\vec{r}_{n-1} - \vec{r}_{s,n-1})^2]^{\frac{1}{2}}} \cdot h$$

(1.27)

In the right-hand sides of equation (1.27), values of position and velocity may be used in either the inertial or ECEF frame, since the formulas are scalars and valid for both.

Using the result of equation (1.27), a partial matrix is created and is used in step 160 to form the Kalman filter measurement equations to generate from the ADR differences an instantaneous velocity estimate. The partial derivative equations described above are formulated in such a way that the Kalman filter produces the instantaneous velocity from the ADR differences. Thus, in step 170, this instantaneous velocity is used to update the velocity component of the state vector during the measurement phase of the Kalman filter processing as represented in step 170.

Thus, the Kalman filter will process an ADR measurement residual for a pair of ranging signal sources (e.g., GPS satellites) in the form of equation (1.7), using the corresponding partials matrix. The partials matrix comprises two partitions. The first partition is for the (object, e.g., spacecraft) position and velocity, and is defined by a difference of two terms, each corresponding to a ranging signal source (e.g., GPS satellite)

and defined by the right-hand side of equation (1.9). The second partition is for the (object, e.g., spacecraft) clock and clock drift, and is defined by the right-hand sides of equation (1.27). If the spacecraft state vector includes additional components (e.g., clock acceleration, solar radiation reflection coefficient, etc.) corresponding partials can be derived and used in a similar way.

The foregoing presents a derivation of measurement equations for processing ADR data. Measurement equations for processing PR are well known in the art, and are not described herein. The Kalman filter will also process the PR measurements to update the position component of the state vector in step 170.

The ADR measurement equations set forth above are formulated in a much more accurate way so that the time interval between the ADR measurements used to compute an ADR difference can be much larger than that used for current ADR differencing techniques for GPS navigation applications. An analogy that illuminates advantages of this technique is as follows.

Consider the task of measuring a dimension (length, width or height) of a large building, such as an office building. One way to make these measurements is with a relatively short ruler. Because the ruler is short, numerous measurements are required with the ruler to complete a measurement of one dimension of the building. The measurement errors will accumulate for the plurality of measurements made with the short ruler. On the other hand, another way to make these measurements is to use a very long measurement tape. In fact, if the measurement tape is long enough, only one measurement may be needed for a dimension of the building, and a much more accurate measurement is obtained. The prior art ADR GPS navigation techniques are akin to using a short ruler to measure a significantly large distance. The measurement error accumulates for each ADR difference computation because the time interval between each ADR measurement is short (e.g., 1 sec), thus analogous to the "short ruler" problem. Such ADR measurement errors decrease the overall accuracy of the navigation computations because of their cumulative effect.

While propagation models used in Kalman filters have been developed and honed to be very accurate, this has not been the case for the equations used for ADR data. The ADR measurement equations set forth above achieve a measurement accuracy that is comparable to the accuracy achieved by many known propagation models. Thus, when updating (e.g., propagating) a state vector with new measurement data, the ADR measurement equations provide highly accurate measurement data for the propagation equations, which overall significantly improves the accuracy of the navigation computations.

Another analogy is to start a stop watch and begin traveling in a car, and after some time interval, stop the stop watch and measure the distance that the car has traveled. Each time the stop watch is started and stopped, error is introduced. If one uses a short time period, the estimate of speed will likely not be very accurate. Conversely, if the car moves at the constant speed, and if one performs a measurement over a long period of time, the estimate of speed becomes much more accurate. While the second option is preferable, it is not always feasible since the assumption of the constant speed may be invalid. In this case, measuring speed over a long time interval will only produce the average speed over this interval. The average speed is of little practical use, since most applications require knowledge of the current state.

These techniques combine the advantage of measuring the object's velocity over relatively long time intervals with the ability to accurately map such measurements to instantaneous velocity at the time of processing. This is accomplished by processing differenced ADR measurements and by applying a mathematical formulation which accurately maps such differences to the current state vector of the user.

A way of explaining the method of this invention is as follows. Note that in the car speed analogy, the distance traveled (which is similar to the ADR difference in the problem at hand) is directionally proportional to the speed of the car. Therefore, the derivative of the distance with respect to the speed of the car is equal to the time span of the measurement. The Kalman filter canonically estimates the velocity by using the measurement itself (in the car analogy, the distance traveled), and its partial derivative with respect to the unknown (in the car analogy, this derivative is the time span of the measurement). In this invention, a high-accuracy method is devised for computing the partial derivatives required by the Kalman filter, which, combined with long time span of each measurements, yields a high-accuracy velocity estimate for the object.

3. Propagation

Set forth below are the propagation equations used by the Kalman filter.

The state vector itself can be propagated using a force model and an integration routine (e.g., Runge-Kutta scheme). Again, this is well known in the art and not described-herein. Propagation of the covariance matrix is more challenging. The starting point is the partial derivative of the state vector at epoch (n+1) with respect to the state vector at epoch n. If these partial derivatives are computed, the covariance matrix can be propagated using standard formulas. The required derivatives are:

$$\Xi_{ij} = \frac{\partial x^E_{n+1,i}}{\partial x^E_{n,j}} \tag{1.28}$$

The state vector has partitions for position, velocity, and clock/drift. Thus, the matrix $\Xi$ has partitions for derivatives of position with respect to velocity, position with respect to clock, velocity with respect to position, etc. These partitions are considered separately below.

a. Derivatives which do not Involve Clock Components

Comparison with equation (1.10) shows that this matrix is similar to matrix $\Lambda$ and it is assumed that computation of $\Lambda$ will help in computing $\Xi$. However, components of the state vector in equation (1.28) are expressed in the ECEF and this requires more than just applying $\Lambda$:

$$\frac{\partial x^E_{n+1,i}}{\partial x^E_{n,j}} = \sum_{k,m} \frac{\partial x^E_{n+1,i}}{\partial x^I_{n+1,k}} \cdot \frac{\partial x^I_{n+1,k}}{\partial x^I_{n,m}} \cdot \frac{\partial x^I_{n,m}}{\partial x^E_{n,j}} \tag{1.29}$$

In equation (1.29), one recognizes that $$\frac{\partial x^I_{n,m}}{\partial x^E_{n,j}} = J_{mj}$$

as defined in equation (1.25), and $$\frac{\partial x_{n+1,k}^I}{\partial x_{n,m}^I} = \Lambda_{km}^+$$

with expressions for $\Lambda_{km}^+$ given by equation (1.21). Superscript "+" indicates that in this case position and velocity are propagated forward, as opposed to backward propagation in the definition for $\Lambda_{km}$ in equation (1.10). (These two cases correspond to using positive and negative values for h in equation (1.21)).

The quantity remaining to be computed is $$\frac{\partial x_{n+1,i}^E}{\partial x_{n+1,k}^I}.$$

In this quantity, both the numerator and the denominator have the same time stamp, and no propagation is involved. All derivatives are due to conversions between frames of reference.

It is assumed in equation (1.29) that the inertial system has its axes aligned with ECEF axes at epoch n. It keeps the same orientation for epoch (n+1). Thus, conversion of $x_{n+1,k}^I$ to $x_{n+1,i}^E$ may be viewed as comprising two operations: conversion from the inertial frame to the ECEF frame at epoch n and then conversion from ECEF at epoch n to that at epoch (n+1). This conversion can be expressed as follows:

$$\frac{\partial x_{n+1,i}^E}{\partial x_{n+1,k}^I} = (\Omega \cdot J^{-1})_{ik} \quad (1.30)$$

where $$\Omega = \begin{pmatrix} M & 0 \\ 0 & M \end{pmatrix}$$

and M is the 3×3 rotation matrix from ECEF at epoch n to that at epoch (n+1). $J^{-1}$ can be formed from J by changing $\vartheta$ to $-\vartheta$. Substitution of all matrices in (1.29) yields the following expression for $\Xi$ partitions, which do not involve clock components:

$$\Xi_{rr} = M \cdot (\Lambda_{rr}^+ + \Lambda_{rv}^+ \cdot \vartheta)$$

$$\Xi_{rv} = M \cdot \Lambda_{rv}^+$$

$$\Xi_{vr} = -M \cdot \vartheta \cdot (\Lambda_{rr}^+ + \Lambda_{rv}^+ \cdot \vartheta) + M \cdot (\Lambda_{vr}^+ + \Lambda_{vv}^+ \cdot \vartheta)$$

$$\Xi_{vv} = M \cdot (\Lambda_{vv}^+ - \vartheta \cdot \Lambda_{rv}^+) \quad (1.31)$$

b. Derivatives of Position/Velocity with Respect to Clock/Drift

This subsection describes computations of the derivatives $$\frac{\partial \vec{r}_{n+1}^E}{\partial \tau}, \frac{\partial \vec{v}_{n+1}^E}{\partial \tau}, \frac{\partial \vec{r}_{n+1}^E}{\partial t}, \text{ and } \frac{\partial \vec{v}_{n+1}^E}{\partial t}.$$

When computing these derivatives, it is noted that the position/velocity at epoch n+1 depends on the position/velocity at epoch n, and the latter in turn depends on the clock error and clock drift. Thus, there is an implicit dependence of the position/velocity at epoch n+1 on the clock/drift at epoch n though position/velocity at epoch n. However, we need to compute partial derivatives, and this implicit dependence must be excluded. The result is as follows.

For conservative equations (as it is the case with satellite dynamics in the Earth gravitational field in the ECEF frame) there is no dependence on the clock error (i.e., derivatives are zero), but there is a slight dependence on the clock drift. It is given by the following formula:

$$\frac{\partial \vec{r}_{n+1}^E}{\partial t} = -\vec{v}_{n+1}^E \cdot h \quad (1.32)$$

$$\frac{\partial \vec{v}_{n+1}^E}{\partial t} = -\vec{a}_{n+1}^E \cdot h$$

where $\vec{a}_{n+1}^E$ is the object acceleration at epoch n+1 in the ECEF frame (acceleration is computed using force models).

c. Derivatives of Clock/Drift with Respect to Other Components

These are trivial and are given by the following:

$$\frac{\partial \tau_{n+1}}{\partial \vec{r}_n^E} = \frac{\partial \tau_{n+1}}{\partial \vec{v}_n^E} = \frac{\partial \dot{t}_{n+1}}{\partial \vec{r}_n^E} = \frac{\partial \dot{t}_{n+1}}{\partial \vec{v}_n^E} = 0 \quad (1.33)$$

$$\frac{\partial \tau_{n+1}}{\partial \tau_n} = 1$$

$$\frac{\partial t_{n+1}}{\partial t_n} = 1$$

$$\frac{\partial \tau_{n+1}}{\partial \dot{t}_n} = h$$

$$\frac{\partial \dot{t}_{n+1}}{\partial \tau_n} = 0$$

4. Higher-Order Gravitational Terms

This section presents computation of matrices $\phi$ for higher-order gravitational terms. The gravitational potential of higher-order terms is typically given in polar coordinates (see, M. Kaplan, Modern Spacecraft Dynamics & Control, John Wiley & Sons, 1976):

$$U(r, \theta, \phi) = \frac{\mu}{r} \sum_{k=2}^{\infty} \sum_{j=0}^{k} \left(\frac{R_E}{r}\right)^k P_k^j(\sin\theta) \cdot \quad (1.34)$$

$$(C_k^j \cos j\phi + S_k^j \sin j\phi)$$

Formula (1.34) differs from formula (7.16) in Kaplan as follows: it uses $\theta$ for latitude (note that it is not the polar angle), $\phi$ for longitude, and $C_k^0$ in place of $-J_k$.

First and second partial derivatives of U with respect to polar coordinates are:

$$\frac{\partial U}{\partial r} = -\frac{\mu}{r^2} \sum_{k=2}^{\infty} \sum_{j=0}^{k} \left(\frac{R_E}{r}\right)^k (k+1) P_k^j(\sin\theta) \cdot \quad (1.35)$$

$$(C_k^j \cos j\phi + S_k^j \sin j\phi)$$

-continued $$\frac{\partial U}{\partial \theta} = \frac{\mu}{r} \sum_{k=2}^{\infty} \sum_{j=0}^{k} \left(\frac{R_E}{r}\right)^k P_k'^j(\sin\theta) \cdot \cos\theta \cdot$$
$$(C_k^j \cos j\phi + S_k^j \sin j\phi)$$

$$\frac{\partial U}{\partial \phi} = \frac{\mu}{r} \sum_{k=2}^{\infty} \sum_{j=0}^{k} \left(\frac{R_E}{r}\right)^k P_k^j(\sin\theta) \cdot j \cdot$$
$$(-C_k^j \sin j\phi + S_k^j \cos j\phi)$$

$$\frac{\partial^2 U}{\partial r^2} = \frac{\mu}{r^3} \sum_{k=2}^{\infty} \sum_{j=0}^{k} \left(\frac{R_E}{r}\right)^k (k+1) \cdot (k+2) \cdot P_k^j(\sin\theta) \cdot$$
$$(C_k^j \cos j\phi + S_k^j \sin j\phi)$$

$$\frac{\partial^2 U}{\partial \phi^2} = -\frac{\mu}{r} \sum_{k=2}^{\infty} \sum_{j=0}^{k} \left(\frac{R_E}{r}\right)^k P_k^j(\sin\theta) \cdot j^2 \cdot$$
$$(C_k^j \cos j\phi + S_k^j \sin j\phi)$$

$$\frac{\partial^2 U}{\partial \theta^2} = \frac{\mu}{r} \sum_{k=2}^{\infty} \sum_{j=0}^{k} \left(\frac{R_E}{r}\right)^k [P_k''^j(\sin\theta) \cdot \cos^2\theta -$$
$$P_k'^j(\sin\theta) \cdot \sin\theta] \cdot (C_k^j \cos j\phi + S_k^j \sin j\phi)$$

$$\frac{\partial^2 U}{\partial r \partial \theta} = -\frac{\mu}{r^2} \sum_{k=2}^{\infty} \sum_{j=0}^{k} \left(\frac{R_E}{r}\right)^k (k+1) \cdot P_k'^j(\sin\theta) \cdot \cos\theta \cdot$$
$$(C_k^j \cos j\phi + S_k^j \sin j\phi)$$

$$\frac{\partial U}{\partial \theta \partial \phi} = \frac{\mu}{r} \sum_{k=2}^{\infty} \sum_{j=0}^{k} \left(\frac{R_E}{r}\right)^k P_k'^j(\sin\theta) \cdot \cos\theta \cdot j \cdot$$
$$(-C_k^j \sin j\phi + S_k^j \cos j\phi)$$

$$\frac{\partial^2 U}{\partial r \partial \phi} = -\frac{\mu}{r^2} \sum_{k=2}^{\infty} \sum_{j=0}^{k} \left(\frac{R_E}{r}\right)^k (k+1) \cdot P_k^j(\sin\theta) \cdot j \cdot$$
$$(-C_k^j \sin j\phi + S_k^j \cos j\phi)$$

Partial derivatives with respect to Cartesian coordinates are computed as follows:

$$\frac{\partial^2 U}{\partial x_i \partial x_j} = \sum_m \frac{\partial^2 \rho_m}{\partial x_i \partial x_j} \cdot \frac{\partial U}{\partial \rho_m} + \sum_{m,n} \frac{\partial \rho_m}{\partial x_j} \cdot \frac{\partial \rho_n}{\partial x_i} \cdot \frac{\partial^2 U}{\partial \rho_m \partial \rho_n} \quad (1.36)$$

where vector $\vec{\rho}$ is defined as $\vec{\rho} = \{r, \theta, \phi\}$. Note that (A3) contains first- and second-order derivatives of polar coordinates with respect to Cartesian coordinates. These derivatives are given by:

$$\frac{\partial r}{\partial x} = \frac{x}{r}; \frac{\partial r}{\partial y} = \frac{y}{r}; \frac{\partial r}{\partial z} = \frac{z}{r}; \quad (1.37)$$

$$\frac{\partial \theta}{\partial x} = -\frac{zx\cos^2\theta}{r_\perp^3}; \frac{\partial \theta}{\partial y} = -\frac{zy\cos^2\theta}{r_\perp^3}; \frac{\partial \theta}{\partial z} = \frac{\cos\theta}{r_\perp};$$

-continued $$\frac{\partial \phi}{\partial x} = -\frac{y}{r_\perp^2}; \frac{\partial \phi}{\partial y} = \frac{\cos\phi}{r_\perp}; \frac{\partial \phi}{\partial z} = -\frac{y}{r_\perp^2};$$

$$\frac{\partial^2 r}{\partial x^2} = \frac{1}{r} - \frac{x^2}{r^3}; \frac{\partial^2 r}{\partial y^2} = \frac{1}{r} - \frac{y^2}{r^3}; \frac{\partial^2 r}{\partial z^2} = \frac{1}{r} - \frac{z^2}{r^3};$$

$$\frac{\partial^2 r}{\partial x \partial y} = -\frac{xy}{r^3}; \frac{\partial^2 r}{\partial x \partial z} = -\frac{xz}{r^3}; \frac{\partial^2 r}{\partial z \partial y} = -\frac{zy}{r^3};$$

$$\frac{\partial^2 \theta}{\partial x^2} = -\frac{z\cos^2\theta}{r_\perp^3} + 3\frac{zx^2\cos^2\theta}{r_\perp^5} + 2\frac{zx\cos\theta \cdot \sin\theta}{r_\perp^3} \cdot \frac{\partial \theta}{\partial x};$$

$$\frac{\partial^2 \theta}{\partial y^2} = -\frac{z\cos^2\theta}{r_\perp^3} + 3\frac{zy^2\cos^2\theta}{r_\perp^5} + 2\frac{zy\cos\theta \cdot \sin\theta}{r_\perp^3} \cdot \frac{\partial \theta}{\partial y};$$

$$\frac{\partial^2 \theta}{\partial z^2} = 2\frac{\cos\theta \cdot \sin\theta}{r_\perp} \cdot \frac{\partial \theta}{\partial z};$$

$$\frac{\partial^2 \theta}{\partial x \partial z} = -2\frac{\cos\theta \cdot \sin\theta}{r_\perp} \cdot \frac{\partial \theta}{\partial x} - \frac{x \cdot \cos^2\theta}{r_\perp^3}$$

$$\frac{\partial^2 \theta}{\partial y \partial z} = -2\frac{\cos\theta \cdot \sin\theta}{r_\perp} \cdot \frac{\partial \theta}{\partial y} - \frac{y \cdot \cos^2\theta}{r_\perp^3}$$

$$\frac{\partial^2 \theta}{\partial x \partial y} = 2\frac{zy\cos\theta \cdot \sin\theta}{r_\perp^3} \cdot \frac{\partial \theta}{\partial x} - 3\frac{zxy \cdot \cos^2\theta}{r_\perp^5}$$

$$\frac{\partial^2 \phi}{\partial x^2} = \frac{2yx}{r_\perp^4};$$

$$\frac{\partial^2 \phi}{\partial y^2} = -\frac{\sin\phi}{r_\perp} \cdot \frac{\partial \phi}{\partial y} - \frac{y \cdot \cos\phi}{r_\perp^3}$$

$$\frac{\partial^2 \phi}{\partial x \partial y} = -\frac{1}{r_\perp^2} + 2\frac{y^2}{r_\perp^4}$$

$$\frac{\partial^2 \phi}{\partial z^2} = \frac{\partial^2 \phi}{\partial z \partial x} = \frac{\partial^2 \phi}{\partial z \partial y} = 0$$

In summary, the partials used in the Kalman filter to process ADR difference data are computed using the following methodology:

1. Convert the state vector from ECEF to an inertial frame, which is momentarily aligned with ECEF (but not rotating).
2. Propagate the current state vector back one step, using the $4^{th}$ order Runge-Kutta scheme.
3. At each substep, compute φ element matrices using equation (1.23) or formulas for higher-order gravitational terms.
4. Substitute these matrices into set (1.22), and the result into set (1.21). This computes Λ.
5. Substitute Λ in equation (1.9) and then apply transformation equation (1.24) to compute partials with respect to position and velocity. Use them for pairs of measurements.
6. Use equation (1.26) for one single measurement and equation (1.27) for pairs to augment partials for the clock and clock drift components.

B. Propagating State Vector Using IMU Data for Integrated GPS-IMU Navigation

The following describes navigation algorithms for processing ADR data in integrated GPS-IMU systems. An IMU does not provide any absolute measurements of object position or velocity, and therefore can be used primarily as an aid in navigation. Actual estimation of position and velocity is still the result of processing GPS measurements. However, IMU data are important as a means of accurate propagation, which is crucial for obtaining high navigation performance, particularly where an accurate propagation model is not already available for the object of interest.

To appreciate the importance of IMU measurements, it is instructive to compare their role to that of a propagation model in space applications. To obtain good accuracy in spacecraft navigation applications, a sophisticated propagation model is vital. Its role is to ensure consistency between measurements collected over an extended period of time. A good propagation model allows setting the process noise to a correspondingly low level, which makes each past measurement from a recent history implicitly contribute to the current estimate almost on par with any current measurement. The result is as if there were more measurements to obtain a solution at any given time. (Of course, past measurements are not applied directly at the present time; instead, the previous estimate is propagated to the current time and is weighed heavily in the solution.) For example, if a propagation model "is good" for 1000 seconds, it facilitates using roughly 1000 times more measurements than in one epoch, which should reduce the navigation error by a factor of $\sqrt{1000} \approx 30$ times.

There is another important consideration: an error in the propagation model is typically highly correlated in time (i.e., systematic), as opposed to random error in the measurements. Systematic errors are not removed by filter averaging, and a small systematic error may cause more harm than a much larger random error. This further emphasizes a need for a good propagation model. Error sources in the propagation model must be examined and mitigated. In doing this, it should be noted that computer implementation of a mathematical model may introduce additional errors, often of a systematic kind. For example, integration of differential equations of motion for spacecraft propagation should use a higher order scheme, such as Runge-Kutta. A low order scheme (e.g., Euler's) is analogous to having an unmodeled acceleration due to errors in representing differential equations in a discrete form.

An attractive application for a good derived propagation model would be to extend methods for velocity estimation via ADR measurements to integrated GPS/IMU navigation processing. If better propagation models are developed for integrated GPS/IMU navigation systems, an extension of ADR processing to such integrated GPS/IMU navigation systems becomes possible.

In a GPS/IMU system, the IMU part of the system serves to some degree as a means of propagating a navigation solution. The following presents a high-accuracy model for propagating a solution using IMU data.

1. Observable Quantities and the State Vector

An IMU measures accelerations and rotation rates. These quantities are time derivatives of velocity and attitude parameters, and may be included in the state vector. However, there may be a significant processing cost associated with this: an IMU typically outputs data at 100 Hz to 1000 Hz, and in generally it is excessive to run the filter processing at such high rate. Instead, acceleration and rotation rate data output by an IMU are used strictly as a propagation tool.

Even when IMU data is used as a propagation tool, there is coupling between the attitude, rotation rates, acceleration, velocity and position. This coupling is due to off-diagonal elements of the covariance matrix and will be explored in detail hereinafter. It is analogous to estimating velocity from position measurements: even though position/range is the measured quantity, the velocity can be estimated because it is coupled with position via off-diagonal elements of the covariance matrix.

This approach allows for avoiding the use of acceleration and rotation rates in the state vector. Candidate parameters for inclusion in the state vector are as follows:

1. Three components of position
2. Three components of velocity
3. Object clock and clock rate
4. Attitude
5. Biases, misalignments, scaling factors and other systematic IMU errors The specific representation of attitude information in the state vector will be described hereinafter. For now, it is noted that attitude is fully described by three parameters.

2. Impact of IMU Measurement Errors on the Propagation

This subsection describes the effects of random IMU error sources.

Propagation is considered over some time period T (e.g., one second) using acceleration measurements $a_i$, which are available at step size h (e.g., h=0.01 second). There is a total of $$N = \frac{T}{h}$$

acceleration measurements per epoch.

If acceleration measurement has error $\eta_i$, the result is the error in the velocity, which can be estimated as $\eta_i h$. This velocity error contributes to propagation of object position during time remaining to the end of the epoch, i.e. during time interval $(T-t_i)$, where $t_i$=ih. The resulting error in the position from this particular measurement is then estimated as follows:

$$\delta x_i = \eta_i h \cdot (T - t_i) \quad (2.1)$$

The variance of this error can be estimated by squaring equation (2.1). Variances from all subepochs add to form the total error variance at the end of the epoch:

$$\overline{\delta x^2} = \sum_{i}^{N} \overline{\delta x_i^2} = \sum_{i}^{N} \overline{\eta^2} \cdot h^2 \cdot (T - ih)^2 \quad (2.2)$$

The computation of the sum yields:

$$\overline{\delta x^2} \approx \frac{1}{3} \overline{\eta^2} \cdot h \cdot T^3 \quad (2.3)$$

Similarly, computation of error variance for velocity yields the following:

$$\overline{\delta v^2} = \overline{\eta^2} \cdot h \cdot T \quad (2.4)$$

Accelerometer errors do not contribute to errors in object attitude.

Gyro measurement errors contribute to object position error, velocity error, and to the attitude error. If rates of rotation $\rho$ are measured each epoch with error $\delta \rho_i$, then errors in attitude, position and velocity are given by:

$$\overline{\delta C^2} = \overline{\delta \rho^2} \cdot h \cdot T \qquad (2.5)$$

$$\overline{\delta x^2} = \frac{1}{20} \overline{\delta \rho^2} \cdot h \cdot a^2 \cdot T^5 \qquad (2.6)$$

$$\overline{\delta v^2} = \frac{1}{3} \overline{\delta \rho^2} \cdot h \cdot T^3 \qquad (2.7)$$

where a is the object acceleration during this epoch (it varies with time, but for the purposes of computing the error variance the acceleration at any point during the epoch, e.g. in the beginning, can be used), and where the error in the position and velocity is non-zero in the directions perpendicular to the acceleration.

As mentioned above, this is a random error, and it can be accounted for by applying process noise to propagated position, velocity and attitude. Biases, misalignments, scaling factors and other systematic errors are treated separately.

3. Measurement Update

Measurement update equations process PR GPS measurements and optionally ADR measurements. The PR measurement update equations are well known in the art, and are therefore not described herein. The ADR measurement update equations are the same as those presented above for GPS-only navigation. The only non-zero components of the measurement matrix are those corresponding to position and the clock bias.

For ADR measurements, differencing or adaptive methods are used for estimating velocity. In the method described herein, ADR measurements are differenced in time to cancel the bias. To achieve the full potential, the ADR differencing is performed over time intervals which span multiple epochs, as described above for GPS-only navigation.

To process a time-differenced ADR measurement as by a Kalman filter, the observation matrix (H) involving partial derivatives of the measurement with respect to the state vector components, is computed:

$$H \equiv \frac{\partial \Delta ADR}{\partial \vec{X}} = \frac{\partial \left\{ \left[ (\vec{x}_n - \vec{x}_{s,n})^2 \right]^{\frac{1}{2}} - \left[ (\vec{x}_{n-M} - \vec{x}_{s,n-M})^2 \right]^{\frac{1}{2}} \right\}}{\partial \vec{X}} \qquad (2.8)$$

where $\vec{X}$ is the object state vector comprising position, velocity, attitude, and IMU error states.

As described above in connection with equations (8) and (9), since object position $\vec{x}_n$ is explicitly used in equation (2.8), it creates an impression that we just have to compute partials with respect to it; however object state $\vec{X}_n$ is the result of the state vector propagation from epoch n−M. Thus, $\vec{X}_n$ is a function of $\vec{X}_{n-M}$; hence $\vec{X}_{n-M}$ is an (inverse) function of $\vec{X}_n$, and $\vec{x}_{n-M}$ (being a part of $\vec{X}_{n-M}$) is a function of $\vec{X}_n$. This results in a more complex computation of the derivatives:

$$\frac{\partial}{\partial \vec{X}_n} \left\{ \frac{\left[ (\vec{x}_n - \vec{x}_{s,n})^2 \right]^{\frac{1}{2}} -}{\left[ (\vec{x}_{n-M} - \vec{x}_{s,n-M})^2 \right]^{\frac{1}{2}}} \right\} = \frac{\chi (\vec{X}_n - \vec{X}_{s,n})}{\left[ (\vec{x}_n - \vec{x}_{s,n})^2 \right]^{\frac{1}{2}}} - \frac{\left[ \Lambda^T (\vec{x}_{n-M} - \vec{x}_{s,n-M}) \right]}{\left[ (\vec{x}_{n-M} - \vec{x}_{s,n-M})^2 \right]^{\frac{1}{2}}} \qquad (2.9)$$

where $$\Lambda_{ij} \equiv \frac{\partial x_{n-M,i}}{\partial X_{n,j}} \qquad (2.10)$$

and $\chi$ contains all zeroes, except for the first three elements of the main diagonal which are equal to 1.

4. Propagation a. Forward Propagation

Forward propagation algorithms are needed for both the state vector and the covariance matrix. With reference to FIG. 6, a method for using IMU data to propagate a state vector computed from PR measurements and ADR differences will be described. In step 200, the observation matrix H is computed from the state vector as indicated in equation 2.10.

i. Propagation of Attitude

Next, in step 210, the attitude component is propagated by propagating a rotation matrix C(t) that transforms a vector from the IMU body axes to the ECI coordinate system. The goal is to derive a propagation algorithm for this matrix, which uses the gyro sensor data.

At each subepoch, matrix C(t) undergoes a small change. This change is due to rotation of the IMU during this subepoch, the rate of which is measured by the gyro in the body system of reference. Thus, if matrix C(t+dt) is needed to transform a vector from the body system to ECI at time (t+dt), it can be done by applying two consecutive steps:

1. Rotate from the body system at time (t+dt) to that at time t

2. Rotate from the body system at time t to ECI by applying matrix C(t)

The first rotation is small, and therefore all three angle rotations are commutative. It is the inverse of the rotation from the body system at time t to that at time (t+dt), which is in the form:

$$\delta C(t) = \begin{pmatrix} 1 & dt\rho_3 & -dt\rho_2 \\ -dt\rho_3 & 1 & dt\rho_1 \\ dt\rho_2 & -dt\rho_1 & 1 \end{pmatrix} = \hat{I} + \hat{\rho}(t) \cdot dt \qquad (2.11)$$

where matrix $\hat{\rho} = [[\vec{\rho}]]$ is a skew-symmetric matrix formed from a three-component vector of rotation rates as measured by the gyro. The inverse of this matrix is simply the same matrix, but with a minus sign after $\hat{I}$. Thus, propagation of matrix C(t) is described by:

$$C(t+dt) = C(t) \cdot (\hat{I} - \hat{\rho} \cdot dt) \qquad (2.12)$$

This formula would be perfectly fine if propagation is needed over an infinitesimally short time interval dt. However, it is modified to propagate it over one epoch (e.g., 1 second). A simple generalization yields:

$$C(t+T) = C(t) \cdot \prod_j \left(\hat{I} - \hat{\rho}(t_j) \cdot dt\right) \tag{2.13}$$

where the order of matrix multiplication is such that later subepochs correspond to the rightmost multipliers in the product. (This expression is closely related to Volterra multiplicative integral.) This propagation scheme has the first order accuracy at each step (i.e., the error of the order of $o(dt^2)$) and the error of the order of $o(dt)$ after propagation over the entire epoch.

In applications where high accuracy is not required, this simple generalization may be sufficient; yet there is room for further improvement. First, the second-order propagation is sought at each step.

Second-order Propagation Scheme for Rotation Matrix

The first step is to centralize the propagation scheme. (In fact, if an additive integral is propagated rather than a multiplicative integral, this would be that is needed.) For brevity, let subscript 0 refer to time t, and subscript 1 refer to time (t+dt). Then, a propagation scheme is sought in the following form:

$$C_1 = C_0 \cdot \left(\hat{I} - \frac{1}{2}(\hat{\rho}_0 + \hat{\rho}_1) \cdot dt\right) + o(dt^2) \tag{2.14}$$

where $C_1$ is the exact value of rotation matrix at time (t+dt). All differences between the exact propagation and our formula are accounted for by the $o(dt^2)$ term.

First consider propagation over two consecutive time intervals. There are two ways to do this: one step 2dt long, or two steps dt each. Since the exact rotation matrix is computed, the results must match:

$$C_2 = C_0 \cdot \left(\hat{I} - \frac{1}{2}(\hat{\rho}_0 + \hat{\rho}_2) \cdot 2dt\right) + 4o(dt^2) \tag{2.15}$$

$$C_2 = C_0 \cdot \left(\hat{I} - \frac{1}{2}(\hat{\rho}_0 + \hat{\rho}_1) \cdot dt\right) \cdot \left(\hat{I} - \frac{1}{2}(\hat{\rho}_1 + \hat{\rho}_2) \cdot dt\right) + 2o(dt^2)$$

Note that in the first case the error $o(dt^2)$ increased by a factor of 4 compared to the single dt formula. This is because $o(dt^2)$ has quadratic dependence on dt, and dt is now two times larger. In the second case, the error increased by a factor of 2 compared to the single dt formula. This is because the same error is obtained twice by applying the propagation twice.

After using Taylor expansion for $\hat{\rho}_1$, the second equation in (2.15) can be approximated as follows:

$$C_2 = C_0 \cdot \left(\hat{I} - \hat{\rho}_0 dt - \frac{1}{2}\dot{\hat{\rho}}_0 \cdot dt^2\right) \cdot \left(\hat{I} - \hat{\rho}_2 dt + \frac{1}{2}\dot{\hat{\rho}}_2 \cdot dt^2\right) + 2o(dt^2) \tag{2.16}$$

Now, the product in equation (2.16) can be computed and the result equated to the first equation in (2.15). The result is as follows (to the second order of accuracy with respect to dt):

$$o(dt^2) = \frac{dt^2}{2} C_0 \cdot \hat{\rho}_0 \cdot \hat{\rho}_2 \tag{2.17}$$

This estimate can be substituted in equation (2.14) for the final result, accurate to the second order with respect to dt:

$$C_1 = C_0 \cdot \left(\hat{I} - \frac{1}{2}(\hat{\rho}_0 + \hat{\rho}_1) \cdot dt + \frac{1}{2}\hat{\rho}_0 \cdot \hat{\rho}_1 \cdot dt^2\right) + o(dt^3) \tag{2.18}$$

Third-Order Propagation Scheme for Rotation Matrix

The same technique can be repeated to obtain a formula valid to the third order with respect to dt. Equations for the rotation matrix after one step 2dt long, and after two steps dt each are as follows:

$$C_2 = C_0 \cdot \left(\hat{I} - \frac{1}{2}(\hat{\rho}_0 + \hat{\rho}_2) \cdot 2dt + 2\hat{\rho}_0 \cdot \hat{\rho}_2 dt^2\right) + 8o(dt^3) \tag{2.19}$$

$$C_2 = C_0 \cdot \left(\hat{I} - \frac{1}{2}(\hat{\rho}_0 + \hat{\rho}_1) \cdot dt + \frac{1}{2}\hat{\rho}_0 \cdot \hat{\rho}_1 dt^2\right) \cdot$$

$$\left(\hat{I} - \frac{1}{2}(\hat{\rho}_1 + \hat{\rho}_2) \cdot dt + \frac{1}{2}\hat{\rho}_1 \cdot \hat{\rho}_2 dt^2\right) + 2o(dt^3)$$

After similar algebra, we obtain:

$$o(dt^3) = \frac{dt^3}{6} \left[ \begin{array}{c} \frac{1}{4}(\ddot{\hat{\rho}}_0 + \ddot{\hat{\rho}}_2) - \frac{1}{2}\hat{\rho}_0(\hat{\rho}_0 + \hat{\rho}_2)\hat{\rho}_2 + \\ (\dot{\hat{\rho}}_0 \cdot \hat{\rho}_2 - \hat{\rho}_0 \cdot \dot{\hat{\rho}}_2) \end{array} \right] \tag{2.20}$$

Thus, the third-order scheme for propagating the rotation matrix is as follows:

$$\hat{C}(t_n) = \hat{C}(t_{n-1}) \cdot \delta\hat{C}(t_{n-1}) \tag{2.21}$$

where:

$$\delta\hat{C}(t_{n-1}) = \hat{I} - \frac{1}{2}(\hat{\rho}_{n-1} + \hat{\rho}_n) \cdot dt + \frac{1}{2}\hat{\rho}_{n-1} \cdot \hat{\rho}_n \cdot dt^2 + \tag{2.22}$$

$$\frac{dt^3}{6}\left[\frac{1}{4}(\ddot{\hat{\rho}}_{n-1} + \ddot{\hat{\rho}}_n) - \frac{1}{2}\hat{\rho}_{n-1}(\hat{\rho}_{n-1} + \hat{\rho}_n)\hat{\rho}_n + (\dot{\hat{\rho}}_{n-1} \cdot \hat{\rho}_n - \hat{\rho}_{n-1} \cdot \dot{\hat{\rho}})\right]$$

ii. Propagation of Position and Velocity

In step 220, the propagation algorithms described above are extended to position and velocity. Propagation involves integration over time, using higher order integration schemes, of an expression that contains the attitude matrix.

The integration is represented as a finite sum, and a scheme is derived that is valid to the second order of accuracy at each step. This requires computation of the attitude matrix to the third order for each step. Indeed, the number of steps preceding the current one is inversely proportional to the step size. Thus, the error in the attitude matrix may accumulate to become of the second order with respect to the step size, which would be consistent with the rest of the scheme. Yet, this consideration does not apply for the approximation of the attitude matrix within the step size for the purposes of derivation a formula for position, where a second-order scheme could be applied.

The following is a derivation for position propagation; a formula for velocity can be derived similarly, and with somewhat less effort.

Position at the end of an epoch (which contains N subepochs) is given by:

$$\vec{x} = \vec{x}_0 + \vec{V}_0 \cdot T + \int_{t_0}^{t_N} \int_{t_0}^{t} \hat{C}(\tau) \cdot \vec{a}(\tau) \, d\tau \, dt \quad (2.23)$$

where $\vec{x}_0$, $\vec{V}_0$ are position and velocity at the beginning of the epoch, and $\vec{a}(\ldots)$ is the acceleration in the body coordinates as measured by the accelerometer. Integration by parts simplifies the above formula to a single integral:

$$\vec{x} = \vec{x}_0 + \vec{V}_0 \cdot T + \int_{t_0}^{t_N} \hat{C}(t) \cdot \vec{a}(t) \cdot (T-t) \, dt \quad (2.24)$$

The goal is to compute this integral. The trapezoid method may be used for approximating the integral by a finite sum. Each step will make the following contribution:

$$\int_{t_{n-1}}^{t_n} \hat{C}(t) \cdot \vec{a}(t) \cdot (T-t) \, dt = \quad (2.25)$$
$$\frac{dt}{2} \cdot \left[ \hat{C}(t_{n-1}) \cdot \vec{a}(t_{n-1}) \cdot (T-t_{n-1}) + \hat{C}(t_n) \cdot \vec{a}(t_n) \cdot (T-t_n) \right] + o(dt^3)$$

Note that this is an exact formula; all errors in the trapezoid method are incorporated in the $o(dt^2)$ term. A similar formula can be derived for velocity propagation; it only differs from (2.25) by the absence of multipliers $(T-t_{n-1})$ and $(T-t_n)$ $\hat{C}(t_{n-1})$ is assumed to be already propagated to time $t_{n-1}$ using the third-order scheme (which may produce a second-order error over n−1 subepochs). For the purposes of this derivation only, the update to the attitude matrix at time $t_n$ can be estimated from that at time $t_{n-1}$ using the second-order scheme:

$$C_n = C_{n-1} \cdot \left( \hat{I} - \frac{1}{2}(\hat{p}_{n-1} + \hat{p}_n) \cdot dt + \frac{1}{2}\hat{p}_{n-1} \cdot \hat{p}_n \cdot dt^2 \right) + o(dt^3) \quad (2.26)$$

The rest of the derivation is as follows: equation (2.26) is substituted in equation (2.25), and the resulting formula is applied to two cases: a single propagation over one step, or two subsequent half-step propagations. The results should be identical (since formula (2.25) is exact). After some algebra, this produces an equation for $o(dt^2)$, which yields the following:

$$\int_{t_{n-1}}^{t_n} \hat{C}(t) \cdot \vec{a}(t) \cdot (T-t) \, dt = \quad (2.27)$$
$$\frac{dt}{2} \cdot \hat{C}(t_{n-1}) \cdot \left[ (T-t_{n-1}) \cdot \vec{a}(t_{n-1}) + (T-t_n) \cdot \delta\hat{C}(t_{n-1}) \cdot \vec{a}(t_n) \right] +$$

-continued $$\frac{dt^3}{6} \cdot \hat{C}(t_{n-1}) \cdot$$
$$\left[ (T-t) \cdot \left( \frac{1}{2}\dot{\hat{p}} \cdot \vec{a} + \hat{p} \cdot \dot{\vec{a}} - \frac{1}{2}\hat{p}^2 \cdot \vec{a} - \frac{1}{2}\ddot{\vec{a}} \right) + (\dot{\vec{a}} - \hat{p} \cdot \vec{a}) \right] + o(dt^4)$$

where values of all parameters in the higher-order term can be computed at any time moment within the $(t_{n-1}, t_n)$ interval (the scheme would still retain the order) and where $\delta\hat{C}(t_{n-1})$ is derived earlier. The total increment in the position is the sum over n of the right-hand part of formula (2.27).

A similar equation for velocity propagation is as follows:

$$\int_{t_{n-1}}^{t_n} \hat{C}(t) \cdot \vec{a}(t) \, dt = \frac{dt}{2} \cdot \hat{C}(t_{n-1}) \cdot \left[ \vec{a}(t_{n-1}) + \delta\hat{C}(t_{n-1}) \cdot \vec{a}(t_n) \right] + \quad (2.28)$$
$$\frac{dt^3}{6} \cdot \hat{C}(t_{n-1}) \cdot \left[ \frac{1}{2}\dot{\hat{p}} \cdot \vec{a} + \hat{p} \cdot \dot{\vec{a}} - \frac{1}{2}\hat{p}^2 \cdot \vec{a} - \frac{1}{2}\ddot{\vec{a}} \right] + o(dt^4)$$

New notations are introduced to simplify:

$$\underline{\vec{V}} = \sum_n \hat{C}(t_{n-1}) \cdot \vec{v}_n \quad (2.29)$$
$$\underline{\vec{x}} = \sum_n \hat{C}(t_{n-1}) \cdot \vec{\chi}_n$$

where $$\vec{v}_n = \frac{dt}{2} \cdot \left[ \vec{a}(t_{n-1}) + \delta\hat{C}(t_{n-1}) \cdot \vec{a}(t_n) \right] + \quad (2.30)$$
$$\frac{dt^3}{6} \cdot \left[ \frac{1}{2}\dot{\hat{p}} \cdot \vec{a} + \hat{p} \cdot \dot{\vec{a}} - \frac{1}{2}\hat{p}^2 \cdot \vec{a} - \frac{1}{2}\ddot{\vec{a}} \right]$$
$$\vec{\chi}_n = (T - t_n) \cdot \vec{v}_n + \vec{\kappa}_n$$
$$\vec{\kappa}_n = \frac{dt^2}{2} \cdot \vec{a}(t_{n-1}) + \frac{dt^3}{6} \cdot (\dot{\vec{a}} - \hat{p} \cdot \vec{a})$$

iii. Misalignments

So far, treatment of IMU errors is limited to accounting for misalignments in the gyro sensor. As noted in the brackets, this is a difficult error to model. In step 230, a vector $\vec{S}$, as described below, is defined that characterizes the misalignment and biases in the IMU sensor into the Kalman filter state vector, and corresponding derivatives are computed.

If the IMU gyro sensor is misaligned, the measured rotation rates are different from the true rotation rates in the body frame of reference. The model which describes this effect is as follows:

$$\vec{\rho}_t = \hat{M} \cdot \vec{\rho} \quad (2.31)$$

where $\vec{\rho}_t$ is the true vector of rotation rates in the body frame, $\vec{\rho}$ is the measured (output) vector, and $\hat{M}$ is some matrix, which rotates $\vec{\rho}$ into $\vec{\rho}_t$. As before, matrix $\hat{p}$ is defined by $\hat{\rho}=[[\vec{\rho}]]$. The matrix $\hat{M}$ is rotational and close to identity matrix, and therefore can be represented in the form:

$$\hat{M} = \hat{I} + \hat{S} + \frac{1}{2}\hat{S}^2 \qquad (2.32)$$

where $\hat{S}=[[\vec{s}\,]]$, and vector $\vec{S}$ characterizes three misalignment parameters. These parameters are generally unknown in the beginning of a navigation application and thus should be estimated.

To incorporate this model in the navigation algorithm, the following are performed:

1. Include vector $\vec{S}$ in the Kalman filter state vector and compute the corresponding partial derivatives.
2. Propagate the state vector with corrected gyro rates by applying formulas (2.31) and (2.32) prior to using $\vec{\rho}$ in propagation equations.
3. Estimate misalignment parameters. They are assumed to be stationary.

To reach item (3), the propagation matrix is computed, which contains partial derivatives of the position and velocity with respect to misalignment parameters. Also, a similar computation is applied to compute partial derivatives of a measurement with respect to these parameters.

The computation of partial derivatives is as follows. Defined are $$\hat{G}(\vec{\rho}_t) = \frac{\partial \hat{\rho}_t}{\partial \vec{S}} \qquad (2.33)$$

$$\hat{F}(\vec{\rho}_{t1}, \vec{\rho}_{t2}) = \frac{\partial \hat{\rho}_{t1} \cdot \hat{\rho}_{t2}}{\partial \vec{S}} = \hat{G}(\vec{\rho}_{t1}) \cdot \hat{\rho}_{t2} + \hat{\rho}_{t1} \cdot \hat{G}(\vec{\rho}_{t2})$$

$$\hat{H}(\vec{\rho}_{t1}, \vec{\rho}_{t2}, \vec{\rho}_{t3}) = \frac{\partial \hat{\rho}_{t1} \cdot \hat{\rho}_{t2} \cdot \hat{\rho}_{t3}}{\partial \vec{S}} = \hat{F}(\vec{\rho}_{t1}, \vec{\rho}_{t2}) \cdot \hat{\rho}_{t3} + \hat{\rho}_{t1} \cdot \hat{\rho}_{t2} \cdot \hat{G}(\vec{\rho}_{t3})$$

and general formulas for $\hat{G}(\vec{\rho}_t)$ are derived, where any $\vec{\rho}_t$, $\vec{\ddot{\rho}}_t$, etc., can be plugged in. Then, these building blocks are used to find the desired partial derivatives.

A derivation for $\hat{G}(\vec{\rho}_t)$ is presented hereinafter, which results in the following:

$$\hat{G}_{jik}(\vec{\rho}_t) = \frac{\partial \hat{\rho}_{tik}}{\partial S_j} = \delta_{jk}\rho_i - \delta_{ij}\rho_k + \qquad (2.34)$$

$$\frac{1}{2}\left\{\delta_{ij}\cdot\left[\vec{S}\times\vec{\rho}\right]_k + S_i\rho_{kj} - \delta_{kj}\cdot\left[\vec{S}\times\vec{\rho}\right]_k - S_k\rho_{ij}\right\}$$

Note that the right-hand part of formula (2.34) contains rotation rates $\rho$, which are not corrected for the misalignments (hence do not have the subscript t). This is because derivation of formula (2.34) accounts for misalignment corrections explicitly.

For derivatives of the attitude matrix, the following recursive formula is provided (where all $\hat{p}$ and their derivatives below stand for values, which are already corrected for misalignments):

$$\frac{\partial \hat{C}(t_n)}{\partial \vec{S}} = \frac{\partial \hat{C}(t_{n-1})}{\partial \vec{S}} \cdot \delta\hat{C}(t_{n-1}) + \hat{C}(t_{n-1}) \cdot \frac{\partial \delta\hat{C}(t_{n-1})}{\partial \vec{S}} \qquad (2.35)$$

or equivalently:

$$\frac{\partial \hat{C}(t_{n-1})}{\partial \vec{S}} = \frac{\partial \hat{C}(t_{n-2})}{\partial \vec{S}} \cdot \delta\hat{C}(t_{n-2}) + \hat{C}(t_{n-2}) \cdot \frac{\partial \delta\hat{C}(t_{n-2})}{\partial \vec{S}} \qquad (2.36)$$

where $$\frac{\partial \delta\hat{C}(t_{n-1})}{\partial \vec{S}} = -\frac{1}{2}\left(\hat{G}(\hat{\rho}_{n-1}) + \hat{G}(\hat{\rho}_n)\right)\cdot dt + \frac{1}{2}\hat{F}(\hat{\rho}_{n-1}, \hat{\rho}_n)\cdot \qquad (2.37)$$

$$dt^2 + \frac{dt^3}{6}\left[\frac{1}{4}\left(\hat{G}(\ddot{\hat{\rho}}_{n-1}) + \hat{G}(\ddot{\hat{\rho}}_n)\right) - \right.$$

$$\frac{1}{2}\hat{H}(\hat{\rho}_{n-1}, \hat{\rho}_{n-1}, \hat{\rho}_n) -$$

$$\frac{1}{2}\hat{H}(\hat{\rho}_{n-1}, \hat{\rho}_n, \hat{\rho}_n) +$$

$$\left.\left(\hat{F}(\hat{\rho}_{n-1}, \dot{\hat{\rho}}_n) - \hat{F}(\hat{\rho}_{n-1}, \dot{\hat{\rho}}_n)\right)\right]$$

For derivatives of the position and velocity:

$$\frac{\partial \vec{V}}{\partial \vec{S}} = \sum_n \hat{v}_n \qquad (2.38)$$

$$\frac{\partial \vec{x}}{\partial \vec{S}} = \sum_n \left\{ \begin{array}{l} (T-t_n)\cdot \hat{v}_n + \frac{\partial \hat{C}(t_{n-1})}{\partial \vec{S}}\cdot \vec{\kappa}_n - \\ \frac{dt^3}{6}\cdot \hat{C}(t_{n-1})\cdot \hat{G}(\vec{\rho})\cdot \vec{a} \end{array} \right\}$$

Where $$\hat{v}_n = \begin{array}{l} \frac{\partial \hat{C}(t_{n-1})}{\partial \vec{S}}\cdot \vec{v}_n + \frac{dt}{2}\cdot \hat{C}(t_{n-1})\cdot \\ \frac{\partial \delta\hat{C}(t_{n-1})}{\partial \vec{S}}\cdot \vec{a}(t_n) + \frac{dt^3}{6}\cdot \hat{C}(t_{n-1})\cdot \\ \left[\frac{1}{2}\hat{G}(\dot{\hat{\rho}})\cdot \vec{a} + \hat{G}(\hat{\rho})\cdot \vec{\dot{a}} - \frac{1}{2}\hat{F}(\hat{\rho}, \hat{\rho})\cdot \vec{a}\right] \end{array} \qquad (2.39)$$

iv. Forward Propagation Matrix

The next step, 240, is to derive a propagation matrix. Partial derivatives of the state vector are computed at the end of an epoch with respect to the state vector at the start of the epoch.

The choice for representation of the attitude in the state vector can be deferred no longer. The attitude matrix itself is not adequate because it has 9 elements, yet is defined by only 3 independent parameters. The Euler angles have a disadvantage of exhibiting degeneration at certain values. Finally, a quaternion representation has two disadvantages: it contains 4 elements (only 3 are independent), and it requires computation of the attitude matrix at each step. Subsequent application of two quaternion rotations is not trivial. This leads us to the following choice for attitude representation: at each epoch, a small angle rotation is defined with three small Euler angles with respect to the current attitude matrix. Thus, the attitude matrix is represented in the form:

$$\hat{C}_\phi(t) = (\hat{I} + [[\vec{\omega}]]) \cdot \hat{C}(t) \qquad (2.40)$$

where $\hat{C}(t)$ is the current estimate of the attitude, and $(\hat{I} + [[\vec{\omega}]])$ is a small rotation in the form:

$$(\hat{I} + [[\vec{\varphi}]]) = \begin{pmatrix} 1 & \varphi_3 & -\varphi_2 \\ -\varphi_3 & 1 & \varphi_1 \\ \varphi_2 & -\varphi_1 & 1 \end{pmatrix} \qquad (2.41)$$

Angles $\phi_1$, $\phi_2$, $\phi_3$ are small, and the corresponding rotations are commutative. These angles form the attitude partition of the state vector.

A close examination of this approach reveals two potential problems:

1. After some time, error accumulation may result in $\phi_1$, $\phi_2$, $\phi_3$ no longer being small. The solution to this problem is periodic (e.g., every epoch) re-balancing of the attitude matrix and of values of $\phi_1$, $\phi_2$, $\phi_3$. Each epoch, rotation $\Delta\hat{C}(t)$ to $\hat{C}(t)$ is applied and thus updates the current attitude matrix, and resets $\phi_1$, $\phi_2$, $\phi_3$ to zeroes. The corresponding transformation should also be applied to covariances of $\phi_1$, $\phi_2$, $\phi_3$. This is similar to linearizing pseudorange measurements at each step with respect to a new, updated estimated position. The only difference is that "linearization" for matrices is multiplicative, rather than additive.

2. Successive application of small rotations may produce a matrix, which is no longer purely rotational (e.g., orthonormality condition $\hat{C}^T(t)\cdot\hat{C}(t)=\hat{I}$ becomes inaccurate). The solution to this problem is to periodically re-cast the attitude matrix to an orthonormal form.

Partials are derived for propagating over one epoch in the inertial system of reference:

$$\vec{V}_{I,1} = \vec{V}_{I,0} + (\hat{I} + [[\vec{\varphi}]]) \cdot \hat{C}_0 \cdot \vec{V}_0 \qquad (2.42)$$

$$\vec{x}_{I,1} = \vec{x}_{I,0} + \vec{V}_{I,0}T + (\hat{I} + [[\vec{\varphi}]]) \cdot \hat{C}_0 \cdot \vec{x}_0$$

Auxiliary computation: $\dfrac{\partial \varphi}{\partial S}$ $$\hat{C}_1 = \hat{C}_0 \cdot \hat{C}_0 \qquad (2.43)$$

If there is a misalignment, the final attitude matrix will differ from the nominal value:

$$\hat{C}_1 + d\hat{C}_1 = \hat{C}_0 \cdot \left( \hat{C}_0 + \dfrac{\partial \hat{C}_0}{\partial \vec{S}} \cdot d\vec{S} \right) \qquad (2.44)$$

On the other hand, this change in the attitude is modeled by parameters $\vec{\omega}$:

$$\hat{C}_1 + d\hat{C}_1 = (I + [[d\vec{\phi}]]) \cdot \hat{C}_1 \qquad (2.45)$$

Comparing (2.44) and (2.45) yields:

$$\left[\left[\dfrac{\partial \vec{\varphi}}{\partial \vec{S}}\right]\right] = \hat{C}_0 \cdot \dfrac{\partial \hat{C}_0}{\partial \vec{S}} \cdot \hat{C}_1^T = \hat{C}_0 \cdot \dfrac{\partial \hat{C}_0}{\partial \vec{S}} \cdot C_0^T \cdot \hat{C}_0^T \qquad (2.46)$$

(The right-hand side of (2.46) is a skew-symmetric matrix; this follows from $$\dfrac{d}{d\vec{S}}(C_0 \cdot C_0^T) = 0.)$$

For a state vector containing position, velocity, attitude, and misalignments, partial derivatives are given by the following:

$$\dfrac{\partial \vec{x}_{I,1}}{\partial \vec{x}_{I,0}} = \dfrac{\partial \vec{V}_{I,1}}{\partial \vec{V}_{I,0}} = \dfrac{\partial \vec{\varphi}_{I,1}}{\partial \vec{\varphi}_{I,0}} = \dfrac{\partial \vec{S}_{I,1}}{\partial \vec{S}_{I,0}} = \hat{I} \qquad (2.47)$$

$$\dfrac{\partial \vec{x}_{I,1}}{\partial \vec{V}_{I,0}} = \hat{I} \cdot T$$

$$\dfrac{\partial x_{I,1,i}}{\partial \varphi_{0,j}} = -[[\hat{C}_0 \cdot \vec{x}_0]]_{ij}$$

$$\dfrac{\partial V_{I,1,i}}{\partial \varphi_{0,j}} = -[[\hat{C}_0 \cdot \vec{V}_0]]_{ij}$$

$$\dfrac{\partial [[\vec{\varphi}_1]]}{\partial \vec{S}_0} = \hat{C}_0 \cdot \dfrac{\partial \hat{C}_0}{\partial \vec{S}} \cdot C_0^T \cdot \hat{C}_0^T$$

$$\dfrac{\partial \vec{V}_{I,1}}{\partial \vec{S}_0} = (\hat{I} + [[\vec{\varphi}_0]]) \cdot \hat{C}_0 \cdot \dfrac{\partial \vec{V}_0}{\partial \vec{S}_0}$$

$$\dfrac{\partial \vec{x}_{I,1}}{\partial \vec{S}_0} = (\hat{I} + [[\vec{\varphi}_0]]) \cdot \hat{C}_0 \cdot \dfrac{\partial \vec{x}_0}{\partial \vec{S}_0}$$

All other components are zero. Derivatives with respect to clock and drift are not shown, but they do not differ from formulas for a purely GPS-based navigation.

These formulas look cumbersome, but there are many opportunities to make a computation more efficient. For example, multiple products of 3×3 matrices $\hat{\rho}_i$ can be simplified, some computations can be reused, etc.

This propagation matrix can be used to propagate covariances. The state vector still has to be propagated using equations (2.29) and (2.30) for position, where attitude is propagated using equations (2.21-2.22)

b. Backward Propagation

Next, in step 250, backward propagation algorithms are required to backward propagate, with a backward propagation matrix, the state vector by multiple epochs and to compute partial derivatives of the past state with respect to components of the current state. Backward propagation is used in the ADR processing.

Even though the state and covariance matrices are propagated backwards, this may not be computed by stepping in time backwards. This would require storing IMU data for the duration of the backward propagation in a stack. If the propagation time is tens of seconds, and the IMU rates are in the hundreds of Hertz, the storage and processing requirements may become excessive. Thus, a backward propagation routine is devised, that would work as going forward. In other words, backward propagation should be based on (and derived from) the forward propagation. This derivation is the subject of this subsection. The backward propagation is based on the forward propagation formulas (2.42), where values of $\hat{\vec{C}}_0$ and $\vec{V}_0$, $\vec{x}_0$ are computed as a function of the state at the end of the multi-epoch propagation interval.

At each epoch, values of $\hat{\vec{C}}_0$ and $\vec{V}_0$, $\vec{x}_0$ in (2.42) are be computed using values of misalignment parameters $\vec{S}$, which are valid at the end of the multiple epoch backward propagation interval. Unfortunately, during the preceding epochs, this future value is unknown. To account for such future value of $\vec{S}$, one should estimate the values of $\hat{\vec{C}}_0$ and $\vec{V}_0$, $\vec{x}_0$ for some fixed $\vec{S}$ (e.g., $\vec{S}=0$) and derivatives of the same with respect to $\vec{S}$. When the value of $\vec{S}$ becomes available at the end of the propagation interval, values of $\hat{\vec{C}}$ and $\vec{V}_0$, $\vec{x}_0$ can be approximated by a two-term Taylor expansion using values at $\vec{S}=0$ and derivatives with respect to $\vec{S}$.

i. Backward Propagation Matrix

To optimally use ADR measurements, the backward propagation matrix is computed over multiple epochs. Thus, such quantities are computed, as:

$$\frac{\partial \vec{x}_{I,0}}{\partial \vec{x}_{I,M}}, \frac{\partial \vec{x}_{I,0}}{\partial \vec{V}_{I,M}}, \frac{\partial \vec{V}_{I,0}}{\partial \vec{x}_{I,M}}, \frac{\partial \vec{V}_{I,0}}{\partial \vec{V}_{I,M}}, \frac{\partial x_{I,0,i}}{\partial \varphi_{I,M,j}}, \frac{\partial V_{I,0,i}}{\partial \varphi_{I,M,j}}, \frac{\partial \vec{V}_{I,0}}{\partial \vec{S}_M}, \frac{\partial \vec{x}_{I,0}}{\partial \vec{S}_M},$$

where M is the number of epochs going backwards.

To go from M−1 to M, the modified equations (2.42) are used as a starting point:

$$\vec{V}_{1,M} = \vec{V}_{1,M-1} + (\hat{I} + [[\vec{\phi}]]) \cdot \hat{\vec{C}}_{M-1} \cdot \dot{\vec{V}}_{M-1}$$

$$\vec{x}_{1,M} = \vec{x}_{1,M-1} + \vec{V}_{1,M-1} T + (\hat{I} + [[\vec{\phi}]]) \cdot \hat{\vec{C}}_{M-1} \cdot \vec{x}_{M-1} \quad (2.48)$$

and compute partial derivatives of these formulas with respect to components of the state vector at epoch M. The state vector comprises four partitions: $\vec{X} = \{\vec{x}_1, \vec{V}_1, \vec{\phi}, \vec{S}\}$, where identity $$\frac{\partial \vec{X}_M}{\partial \vec{X}_M} = \hat{I}.$$

The attitude matrix $\hat{\vec{C}}_{M-1}$ is time-stamped at epoch M−1; hence for the purposes of derivative computation it should be considered a result of the backward propagation of the attitude matrix from epoch M to M−1. Before getting formulas for the backward propagation matrix, two auxiliary formulas are derived below.

ii. Auxiliary Computation: Derivatives of the Attitude Matrix

For the attitude matrix, the following is used:

$$\hat{\vec{C}}_M = \hat{\vec{C}}_{M-1} \cdot \hat{\vec{C}}_{M-1} \quad (2.49)$$

where $\hat{C}_{M-1}$ is given by (2.21) (note that (2.21) describes propagation over one subepoch, and must be repeated multiple times to get $\hat{C}_{M-1}$, which describes propagation over one epoch). This yields:

$$\hat{\vec{C}}_{M-1} = \hat{\vec{C}}_M \cdot \hat{C}_{M-1}^T \quad (2.50)$$

and $$\frac{\partial \hat{\vec{C}}_{M-1}}{\partial \vec{S}} = \hat{\vec{C}}_M \cdot \left(\frac{\partial \hat{C}_{M-1}}{\partial \vec{S}}\right)^T = \hat{\vec{C}}_{M-1} \cdot \hat{C}_{M-1} \cdot \left(\frac{\partial \hat{C}_{M-1}}{\partial \vec{S}}\right)^T \quad (2.51)$$

iii. Auxiliary Computation:

$$\frac{\partial \varphi}{\partial S}$$

This is similar to the previous computation of $$\frac{\partial \varphi}{\partial S},$$

but now derivatives are computed for backward propagation using:

$$\hat{\vec{C}}_{M-1} = \hat{\vec{C}}_M \cdot \hat{C}_{M-1}^T \quad (2.52)$$

If there is a misalignment, the final attitude matrix will differ from the nominal value:

$$\hat{\vec{C}}_{M-1} + d\hat{\vec{C}}_{M-1} = \hat{\vec{C}}_M \cdot \left(\hat{C}_{M-1}^T + \frac{\partial \hat{C}_{M-1}^T}{\partial \vec{S}} \cdot d\vec{S}\right) \quad (2.53)$$

On the other hand, this change in the attitude is modeled by parameters A:

$$\hat{\vec{C}}_{M-1} + d\hat{\vec{C}}_{M-1} = (I + [[d\vec{\phi}_{M-1}]]) \cdot \hat{\vec{C}}_{M-1} \quad (2.54)$$

Comparing (2.53) and (2.54) yields:

$$\frac{\partial [[\vec{\varphi}_{M-1}]]}{\partial \vec{S}} = \hat{\vec{C}}_M \cdot \frac{\partial \hat{C}_{M-1}^T}{\partial \vec{S}} \hat{C}_{M-1}^T \quad (2.55)$$

$$= \hat{\vec{C}}_{M-1} \cdot \hat{C}_{M-1} \cdot \frac{\partial \hat{C}_{M-1}^T}{\partial \vec{S}} \cdot \hat{\vec{C}}_0^T$$

Now the derivatives for the backward propagation matrix can be written as follows:

$$\frac{\partial \vec{x}_{I,M-1}}{\partial \vec{x}_{I,M}} = \frac{\partial \vec{V}_{I,M-1}}{\partial \vec{V}_{I,M}} = \frac{\partial \vec{\varphi}_{I,M-1}}{\partial \vec{\varphi}_{I,M}} = \frac{\partial \vec{S}_{I,M-1}}{\partial \vec{S}_{I,M}} = \hat{I}$$

$$\frac{\partial \vec{x}_{I,M-1}}{\partial \vec{V}_{I,M}} = -\hat{I} \cdot T$$

-continued $$\frac{\partial \vec{V}_{I,M-1}}{\partial \vec{\varphi}_M} = [[\hat{\vec{C}}_{M-1} \cdot \vec{V}_{M-1}]]$$

$$\frac{\partial \vec{x}_{I,M-1}}{\partial \vec{\varphi}_M} = [[\hat{\vec{C}}_{M-1} \cdot (\vec{x}_{M-1} - T \cdot \vec{V}_{M-1})]]$$

$$\frac{\partial [[\vec{\varphi}_{M-1}]]}{\partial \vec{S}_M} = \hat{C}_{M-1} \cdot \hat{C}_{M-1} \cdot \frac{\partial \hat{C}_{M-1}^T}{\partial S} \cdot \hat{C}_{M-1}^T$$

$$\frac{\partial \vec{V}_{I,M-1}}{\partial \vec{S}_M} = -(\hat{I} + [[\vec{\varphi}]]) \cdot \hat{C}_{M-1} \cdot \frac{\partial \vec{V}_{M-1}}{\partial \vec{S}_{M-1}} - $$

$$\hat{C}_{M-1} \cdot \hat{C}_{M-1} \cdot \frac{\partial \hat{C}_{M-1}^T}{\partial S} \cdot \vec{V}_{M-1}$$

$$\frac{\partial \vec{x}_{I,M-1}}{\partial \vec{S}_M} = -\frac{\partial \vec{V}_{I,M-1}}{\partial \vec{S}_M} \cdot T - (\hat{I} + [[\vec{\varphi}]]) \cdot \hat{C}_{M-1} \cdot $$

$$\frac{\partial \vec{x}_{M-1}}{\partial \vec{S}_{M-1}} - \hat{C}_{M-1} \cdot \hat{C}_{M-1} \cdot \frac{\partial \hat{C}_{M-1}^T}{\partial S} \cdot \vec{x}_{M-1}$$

All other components are zero.

Armed with these formulas, we recursive formulas for $$\frac{\partial \vec{X}_0}{\partial \vec{X}_M}$$

can be written:

$$\frac{\partial \vec{X}_0}{\partial \vec{X}_M} = \frac{\partial \vec{X}_0}{\partial \vec{X}_{M-1}} \cdot \frac{\partial \vec{X}_{M-1}}{\partial \vec{X}_M} \qquad (2.57)$$

c. Backward Propagation of the State Vector

A recursive algorithm is defined:

$$\vec{v}_M = \vec{v}_{M-1} + \hat{C}_0^T \cdot \hat{C}_{M-1} \cdot \vec{V}_{M-1}$$

$$\vec{\chi}_M = \vec{\chi}_{M-1} + T \cdot \vec{v}_{M-1} + \hat{C}_0^T \cdot \hat{C}_{M-1} \cdot \vec{x}_{M-1} \qquad (2.58)$$

where $\vec{v}_0 = 0$, $\vec{\chi}_0 = 0$. Product $\hat{C}_0^T \cdot \hat{C}_{M-1}$ is nothing more than $$\prod_{m=0}^{M-1} \hat{C}_m$$

product of individual matrices $\hat{C}_m$.

Solving the first equation of (2.58) for $\hat{C}_{M-1} \cdot \vec{V}_{M-1}$ and substituting the result in the first equation of (2.48) yields the following:

$$\vec{V}_M - \vec{V}_{M-1} = (I + [[\varphi]]) \cdot \hat{C}_0 \cdot (\vec{v}_M - \vec{v}_{M-1}) \qquad (2.59)$$

Summation of (2.59) over M produces a desired backward propagation formula for $\vec{V}_0$:

$$\vec{V}_0 = \vec{V}_M - (I + [[\varphi]]) \cdot \hat{C}_0 \cdot \vec{v}_M \qquad (2.60)$$

Similarly, solving the second equation of (2.58) for $\hat{C}_{M-1} \cdot \vec{x}_{M-1}$ and substituting the result in the second equation of (2.48):

$$\vec{x}_M - \vec{x}_{M-1} = T \cdot \vec{V}_{M-1} + (I + [[\varphi]]) \cdot \hat{C}_0 \cdot (\vec{\chi}_M - \vec{\chi}_{M-1} - T \cdot \vec{v}_{M-1}) \qquad (2.61)$$

Next equation (2.60) is used, changing the subscript there from M to M−1, solving the resulting equation for $\vec{V}_{M-1}$ and substituting in (2.61) to obtain:

$$\vec{x}_M - \vec{x}_{M-1} = T \cdot \vec{V}_0 + (I + [[\varphi]]) \cdot \hat{C}_0 \cdot (\vec{\chi}_M - \vec{\chi}_{M-1}) \qquad (2.62)$$

Summation of (2.62) over M produces a desired backward propagation formula for $\vec{x}_0$:

$$\vec{x}_0 = \vec{x}_M - M \cdot T \cdot \vec{V}_0 - (I + [[\varphi]]) \cdot \hat{C}_0 \cdot \vec{\chi}_M \qquad (2.63)$$

Formulas (2.60) and (2.63), where $\vec{v}_M$, $\vec{\chi}_M$ are computed by applying (2.58), serve as a foundation of the backward propagation algorithm.

Thus, as indicated in step 260, the backward propagation matrix is used to form the Kalman filter measurement equations, and in step 270, the Kalman filter processes the PR measurements and ADR differences and updates the state vector.

C. Illustration of Navigation Performance

Figure 7:
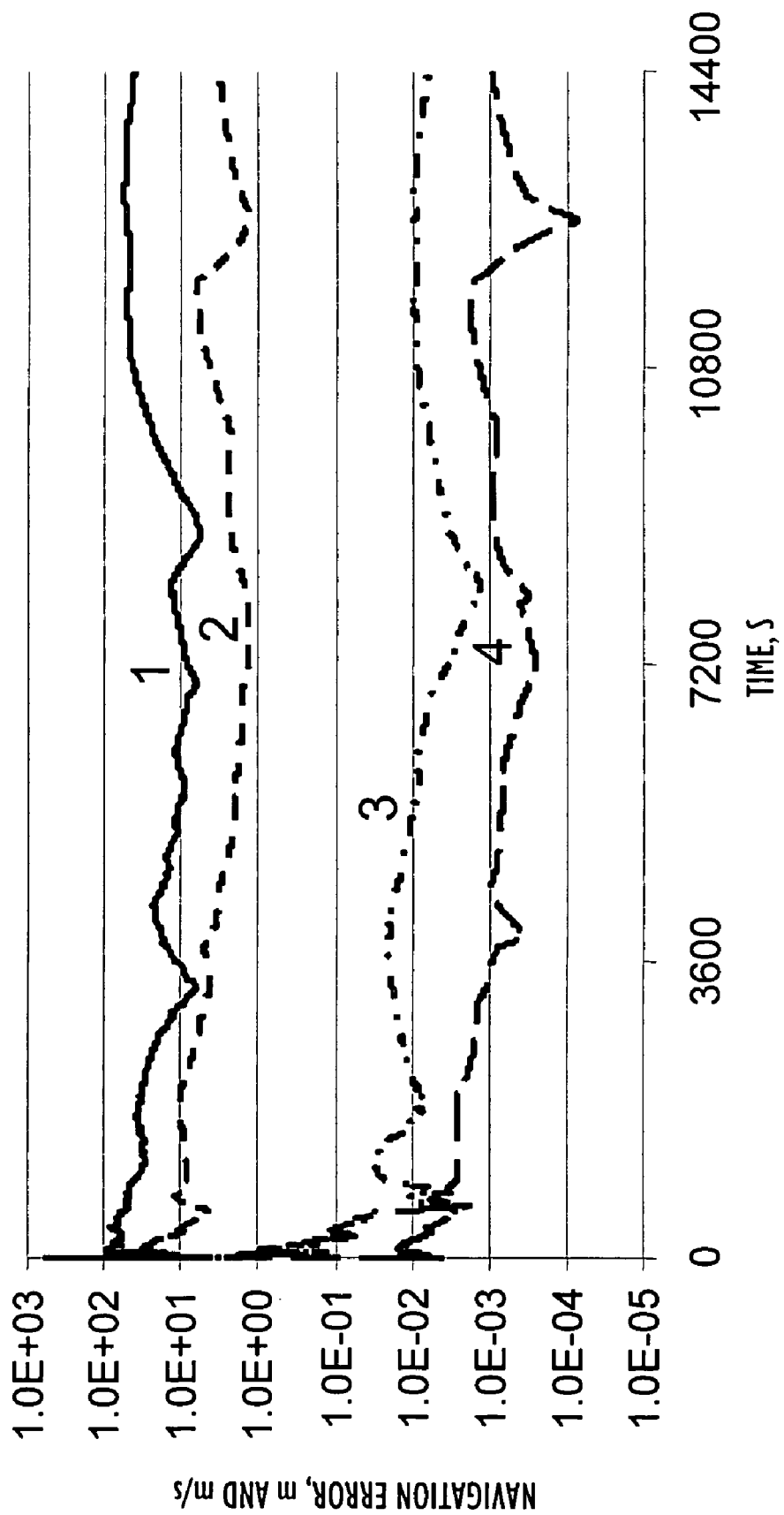
FIG. 7 is a diagram containing plots of navigation error versus time for the GPS-only navigation computations represented by the flow chart of FIG. compared with conventional GPS processing.
Figure 8:
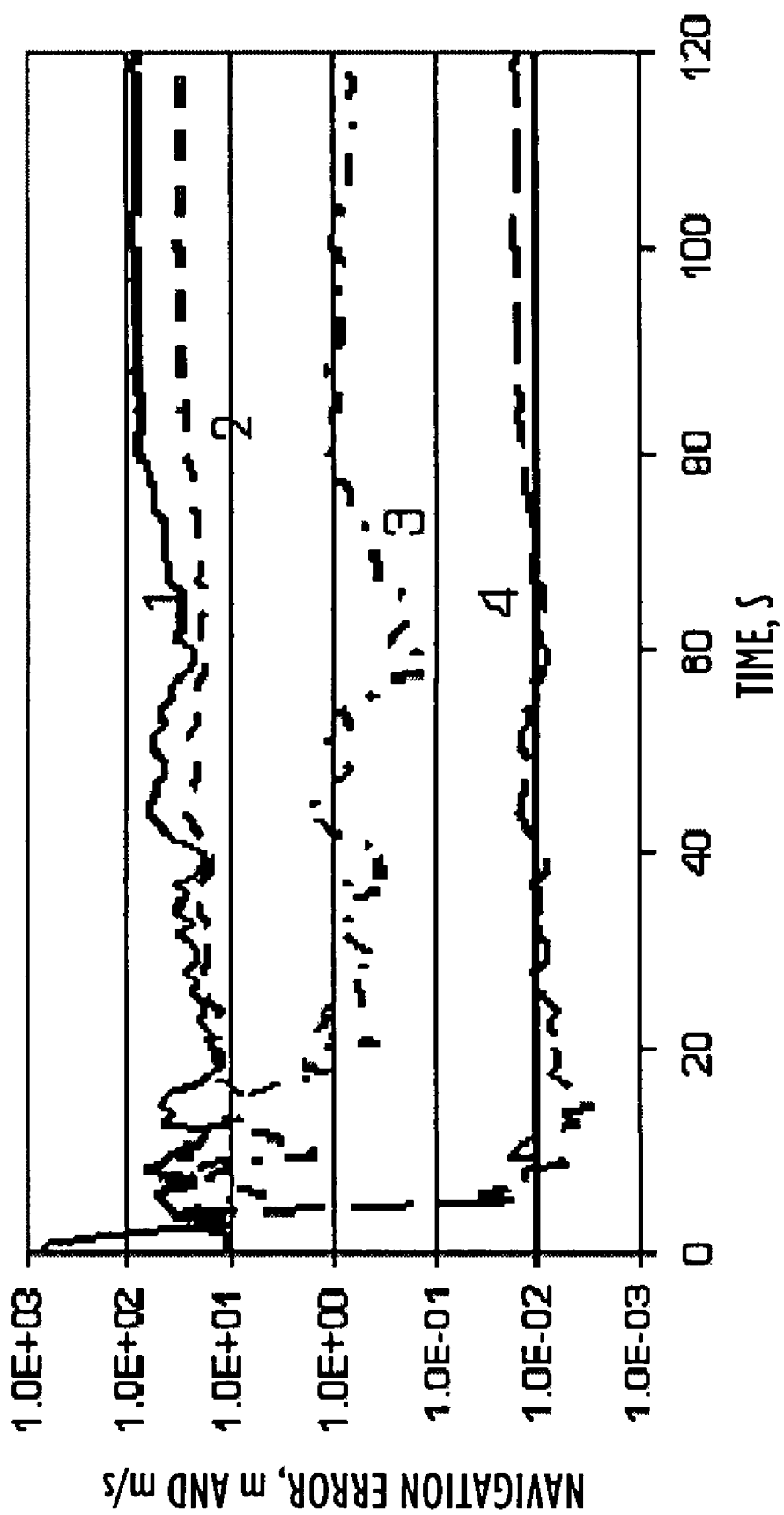
FIG. 8 is a diagram containing plots of navigation error versus time for the first two minutes of ADR processing, magnified from the plots shown in FIG. 7.

FIGS. 7 and 8 illustrate simulation results of navigation error (position error in meters, m, and velocity error in meters/sec, m/s) as a function of time for conventional GPS algorithms (using PR measurements only) compared with the PR+ADR processing techniques described above in conjunction with FIG. 5. The circumstances of this simulation are as follows:

A satellite in a geostationary orbit.

GPS signals received with $S/N_0 > 27$ dB·Hz. This corresponds to tracking signals in the main lobe of the GPS transmitting antenna and at the peak of the first sidelobe.

Code (PR) tracking error is Gaussian, uncorrelated, and calibrated to have 1 m standard deviation for a signal in the boresight of the GPS antenna. For weaker signals, the tracking error is scaled by 1/square root of $S/N_0$.

Ephemeris error is Gaussian, highly correlated in time, has a 1.4 m standard deviation for pseudorange measurements Carrier (ADR) tracking error is Gaussian, uncorrelated, and calibrated to have standard deviation 1/100th of that for the code.

User clock has drift and random walk error with a standard deviation of 15 cm/s.

Trace 1 is the position error for conventional PR processing. Trace 2 is the position error using PR+ADR processing. Trace 3 is the velocity error for conventional PR processing. Trace 4 is the velocity error for PR+ADR processing. The improvement in the navigation error of the PR+ADR processing techniques described herein over GPS navigation using conventional PR measurement only is nearly an order of magnitude.

FIG. 8 shows a magnified portion for the first two minutes of the Plots shown in FIG. 7. In FIG. 8, ADR processing starts at t=5. The sharp drop in the velocity navigation error immediately after the start of ADR processing (trace 4) is very evident.

With regard to the GPS-IMU navigation algorithms described herein, simulations were performed under the following conditions:

IMU produces ideal data (noise and biases are zero)

Pseudorange measurements have Gaussian error with 1 m standard deviation

ADR measurements have Gaussian error with 1 cm standard deviation

Figure 9:
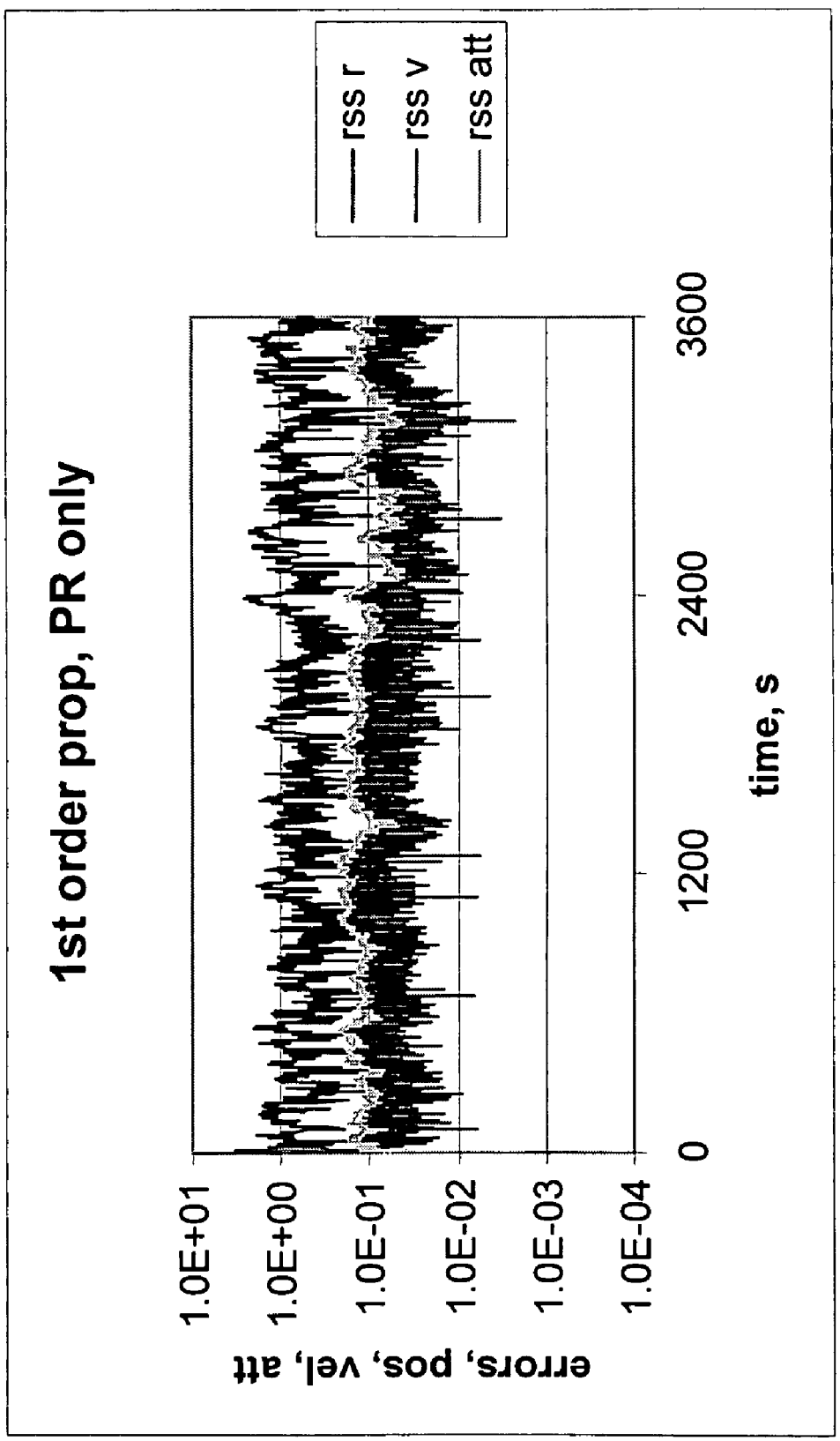
FIG. 9 is a diagram containing plots of root-sum-squared navigation errors as function of time using first order propagation of IMU data for PR measurements only.
Figure 10:
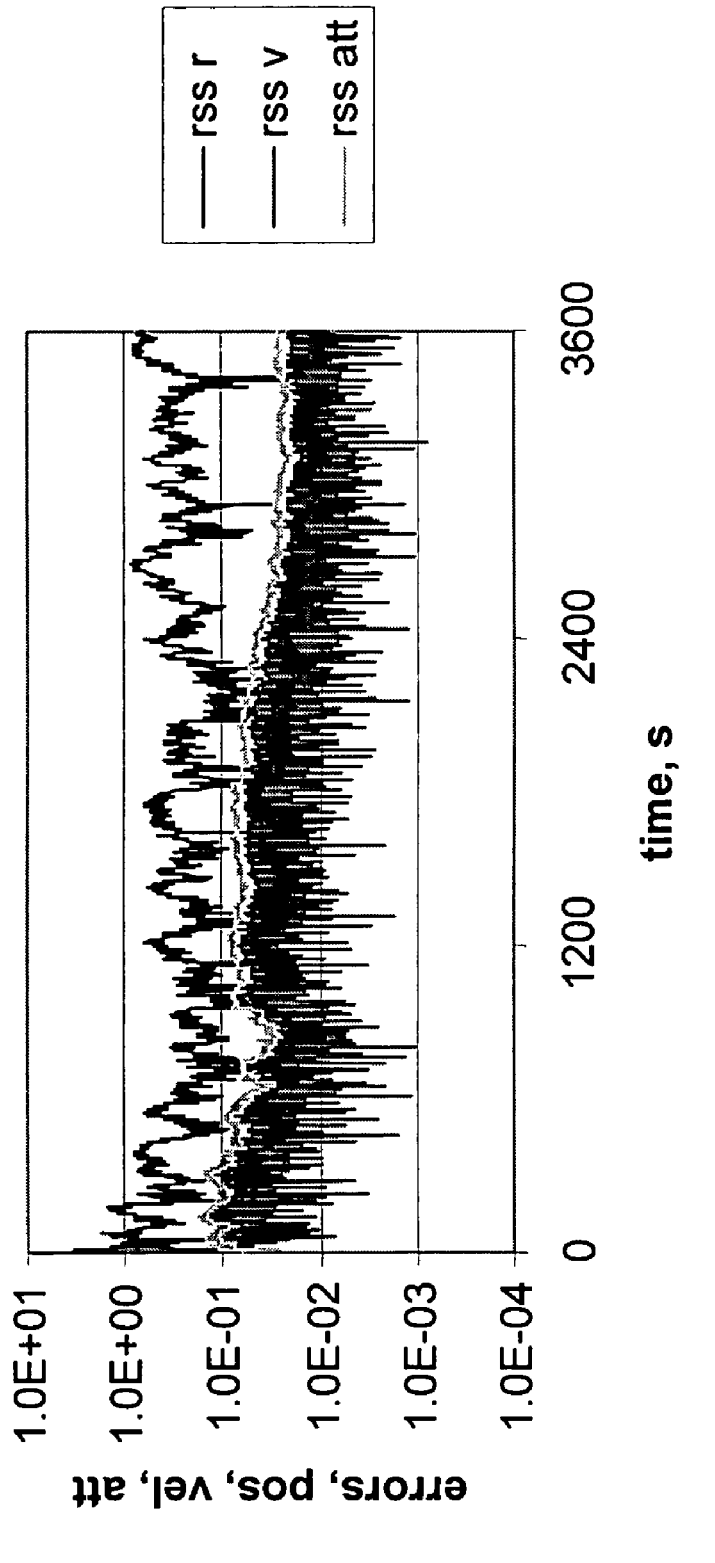
FIG. 10 is a diagram containing plots of root-sum-squared navigation errors as function of time using third order propagation of IMU data for PR measurements only.
Figure 11:
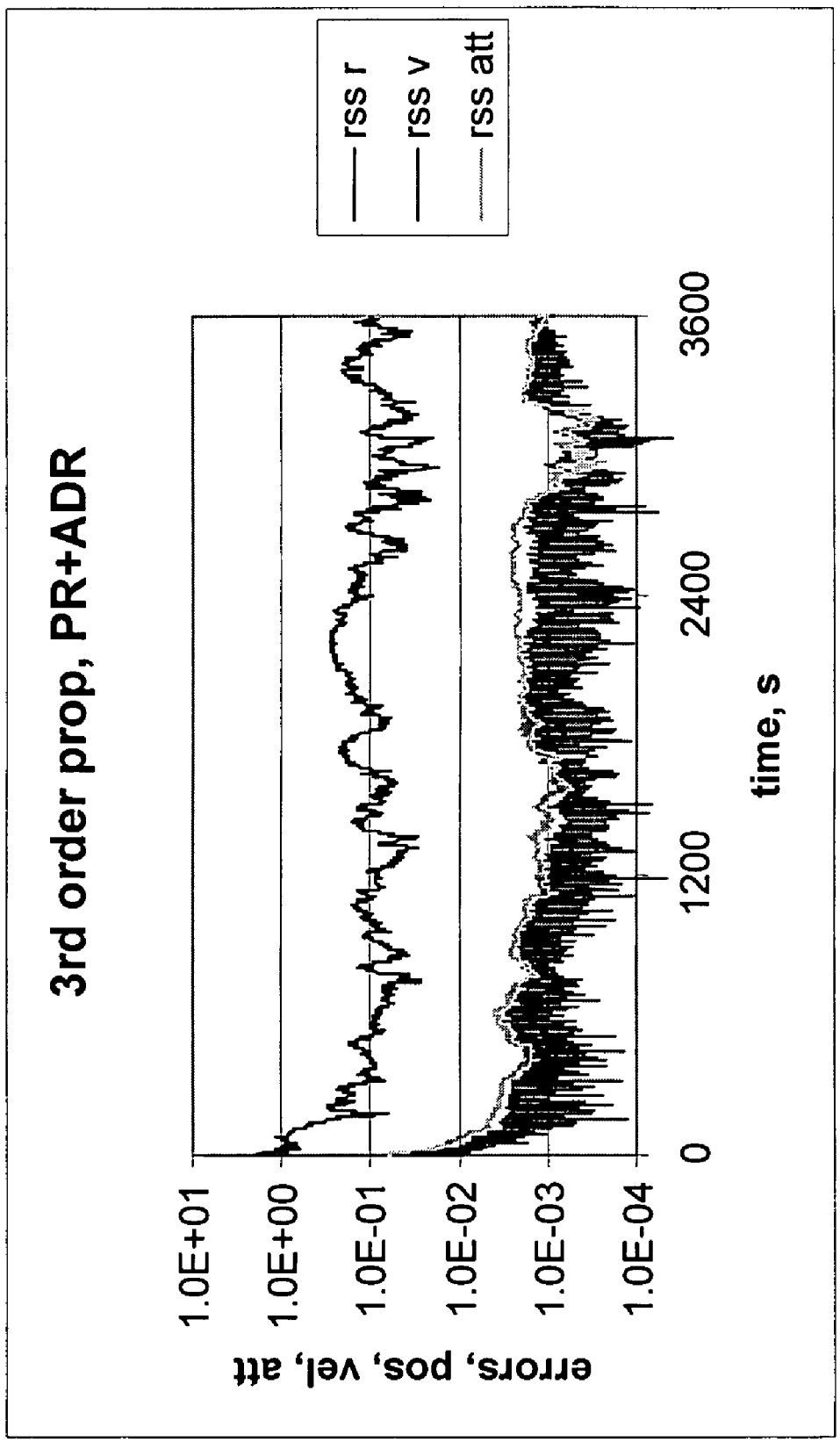
FIG. 11 is a diagram containing plots of root-sum-squared navigation errors as function of time using third order propagation of IMU data for PR and ADR measurements.

FIGS. 9-10 show the results of these simulations, where the root-sum-squared (RSS) navigation errors are shown as a function of time for position (meters), velocity (m/s), and attitude (components of the attitude matrix, roughly corresponds to radians). FIG. 9 shows the errors for these parameters when only PR measurements were processed and the propagation algorithm was limited to the first order. FIG. 10 shows the error for these parameters using a second order propagation algorithm using only PR measurements. FIG. 11 shows the error for these parameters using a third order propagation algorithm for PR and ADR difference measurements. These figures show a two order of magnitude improvement in the attitude and velocity estimation and one order of magnitude improvement in the position estimation which uses ADR processing in conjunction with accurate propagation algorithms.

An accurate propagation algorithm is a key factor in enabling new methods of ADR processing for space applications. The methods described herein achieve extraordinary precision in measuring velocity of a spacecraft. Estimates for a GEO spacecraft promise achieving measurement accuracies on the order of 0.1 mm/s for each individual measurement.

Propagation equations for an integrated GPS/IMU system can be used in a similar way. Better quality of propagation allows one to use a difference in ADR measurements taken many epochs apart for greater accuracy. A difference between the space propagation and IMU-driven propagation is that in the latter case, ADR measurements would apply to estimation of velocity and attitude.

III. Miscellaneous Derivations

A. Derivation of Formula for G

Throughout this derivation, the following identities are used:

$$[[\vec{u}]] \cdot \vec{v} = \hat{u} \cdot \vec{v} = -[\vec{u} \times \vec{v}] \tag{3.1}$$

$$\frac{\partial [\vec{u} \times \vec{v}]_i}{\partial u_j} = (\hat{v})_{ij}$$

$$[\vec{a} \times [\vec{b} \times \vec{c}]] = \vec{b} \cdot (\vec{a} \cdot \vec{c}) - \vec{c} \cdot (\vec{a} \cdot \vec{b})$$

1. Expression 1

First computed is:

$$\hat{A} = \frac{\partial[[\hat{S} \cdot \vec{\rho}]] \cdot \vec{x}}{\partial \vec{S}} \tag{3.2}$$

where $\vec{x}$ is an arbitrary vector. Then $$\hat{A} = -\frac{\partial[(\hat{S} \cdot \vec{\rho}) \times \vec{x}]}{\partial \vec{S}} \tag{3.3}$$

$$= \frac{\partial[\vec{x} \times (\hat{S} \cdot \vec{\rho})]}{\partial \vec{S}} = -\frac{\partial[\vec{x} \times [\vec{S} \times \vec{\rho}]]}{\partial \vec{S}}$$

$$= \frac{\partial}{\partial \vec{S}}\{-\vec{S} \cdot (\vec{\rho} \cdot \vec{x}) + \vec{\rho} \cdot (\vec{S} \cdot \vec{x})\}$$

Vector $\vec{x}$ is set equal to the k-th unit vector of the reference frame. Then derivatives can be computed as follows:

$$\frac{\partial[[\hat{S} \cdot \vec{\rho}]]_{ik}}{\partial S_j} = \frac{\partial}{\partial S_j}\{-S_i \rho_k + \rho_i S_k\} \tag{3.4}$$

$$= \delta_{jk}\rho_i - \delta_{ij}\rho_k$$

2. Expression 2

The next step is to compute the following expression:

$$\hat{B} = \frac{\partial[[\hat{S}^2 \cdot \vec{\rho}]] \cdot \vec{x}}{\partial \vec{S}} \tag{3.5}$$

$$= \frac{\partial}{\partial \vec{S}}[\vec{x} \times [\vec{S} \times [\vec{S} \times \vec{\rho}]]]$$

$$= \frac{\partial}{\partial \vec{S}}\{\vec{S} \cdot (\vec{x} \cdot [\vec{S} \times \vec{\rho}]) - [\vec{S} \times \vec{\rho}] \cdot (\vec{x} \cdot \vec{S})\}$$

Again, $\vec{x}$ is set equal to the k-th unit vector of the reference frame:

$$\frac{\partial[[\hat{S}^2 \cdot \vec{\rho}]]_{ik}}{\partial \vec{S}} = \frac{\partial}{\partial \vec{S}}\{S_i \cdot [\vec{S} \times \vec{\rho}]_k - [\vec{S} \times \vec{\rho}]_i \cdot S_k\} \tag{3.6}$$

Then $$\frac{\partial[[\hat{S}^2 \cdot \vec{\rho}]]_{ik}}{\partial S_j} = \delta_{ij} \cdot [\vec{S} \times \vec{\rho}]_k + S_i \rho_{kj} - \delta_{kj} \cdot [\vec{S} \times \vec{\rho}]_i - S_k \rho_{ij} \tag{3.7}$$

3. Final Expression

With these building blocks, the following is computed:

$$\frac{\partial(\hat{\rho}_t)_{ik}}{\partial S_j} = \frac{\partial}{\partial S_j}\left[\left[\vec{\rho} + \hat{S} \cdot \vec{\rho} + \frac{1}{2}\hat{S}^2 \cdot \vec{\rho}\right]\right]_{ik} \tag{3.8}$$

$$= \delta_{jk}\rho_i - \delta_{ij}\rho_k + \frac{1}{2}$$

$$\{\delta_{ij} \cdot [\vec{S} \times \vec{\rho}]_k + S_i \rho_{kj} - \delta_{kj} \cdot [\vec{S} \times \vec{\rho}]_i - S_k \rho_{ij}\}$$

B. Derivation of x, V Propagation Formulas

Starting from $$I_{n-1} = \int_{t_{n-1}}^{t_n} (T - \alpha t) \cdot \hat{C}(t) \cdot \vec{a}(t) \cdot dt \tag{3.9}$$

This integral can be used to derive both the position and the velocity propagation formulas. For position, $\alpha=1$ in the final result. For velocity, set $\alpha=0$, $T=1$. Using the trapezoid method:

$$I_{n-1} = \frac{dt}{2} \cdot \hat{C}(t_{n-1}) \cdot [(T - \alpha t_{n-1}) \cdot \vec{a}(t_{n-1}) + (T - \alpha t_n) \cdot \delta\hat{C}(t_{n-1}) \cdot \vec{a}(t_n)] + o(dt^3) \tag{3.10}$$

Next, the same quantity is estimated, but using two half-steps:

$$I_{n-1} = \frac{dt}{4} \cdot \hat{C}(t_{n-1}) \cdot \tag{3.11}$$

$$[(T - \alpha t_{n-1}) \cdot \vec{a}(t_{n-1}) + 2(T - \alpha t_{n-1/2}) \cdot \delta\hat{C}_{1/2}(t_{n-1}) \cdot \vec{a}(t_{n-1/2}) + \delta\hat{C}(t_n) \cdot \vec{a}(t_n) \cdot (T - +\frac{1}{4}o(dt^3))$$

where $\delta\hat{C}_{1/2}(t_{n-1})$ is the attitude matrix update from $t_{n-1}$ to $t_{n-1/2}$. The second term J is denoted and split it in two parts:

$$J = 2(T - \alpha t_{n-1/2})\delta\hat{C}_{1/2}(t_{n-1}) \cdot \vec{a}_{n-1/2} = (T - \alpha t_n)\delta\hat{C}_{1/2}(t_{n-1}) \cdot \vec{a}_{n-1/2} + (T - \alpha t_{n-1})\delta\hat{C}_{1/2}(t_{n-1}) \cdot \vec{a}_{n-1/2} \tag{3.12}$$

Substituted in J are two separate expressions for the two occurrences of $\vec{a}_{n-1/2}$ (hereafter omitting subscripts n, n−½, n−1 in the terms, where the exact subscript does not matter within the goal accuracy limit):

$$\vec{a}_{n-1/2} = \vec{a}_{n-1} + \frac{dt}{2}\dot{a}_{n-1} + \frac{dt^2}{8}\ddot{a} \tag{3.13}$$

$$\vec{a}_{n-1/2} = \vec{a}_n - \frac{dt}{2}\dot{a}_{n-1} - \frac{3dt^2}{8}\ddot{a}$$

Substituting two separate expressions for $\delta\hat{C}_{1/2}(t_{n-1})$. The first expression is from the general expression for $\delta\hat{C}$:

$$\delta\hat{C}_{1/2}(t_{n-1}) = I - \frac{dt}{4}\left(2\rho_{n-1} + \frac{dt}{2}\dot{\rho}_{n-1}\right) + \frac{dt^2}{8}\rho^2 \tag{3.14}$$

The second expression for $\delta\hat{C}_{1/2}(t_{n-1})$ is obtained from an identity:

$$\delta\hat{C}_{1/2}(t_{n-1})\delta\hat{C}_{1/2}(t_{n-1/2}) = \delta\hat{C}t_{n-1} \tag{3.15}$$

Then:

$$\delta\hat{C}_{1/2}(t_{n-1}) = \delta\hat{C}(t_{n-1}) \cdot [\delta\hat{C}_{1/2}(t_{n-1/2})]^{-1} \tag{3.16}$$

For $[\delta\hat{C}_{1/2}(t_{n-1/2})]^{-1}$ the following is used:

$$[\delta\hat{C}_{1/2}(t_{n-1/2})]^{-1} = I + \frac{dt}{4}(\rho_{n-1/2} + \rho_{n-1/2}) + \frac{dt^2}{8}\rho^2 \tag{3.17}$$

$$= I + \frac{dt}{4}\left(2\rho_{n-1} + \frac{3dt}{2}\dot{\rho}\right) + \frac{dt^2}{8}\rho^2$$

All these substitutions yield:

$$J = (T - \alpha t_n)\delta\hat{C}(t_{n-1}) \cdot \left(I + \frac{dt}{2}\rho_{-1} + \frac{3dt^2}{8}\dot{\rho} + \frac{dt^2}{8}\rho^2\right) \tag{3.18}$$

$$\left(a_n - \frac{dt}{2}\dot{a}_{n-1} - \frac{3dt^2}{8}\ddot{a}\right) +$$

$$(T - \alpha t_{n-1})\left(I - \frac{dt}{2}\rho_{n-1} - \frac{dt^2}{8}\dot{\rho}_{n-1} + \frac{dt^2}{8}\rho^2\right)\left(a_n + \frac{dt}{2}\dot{a}_{n-1} + \frac{dt^2}{8}\ddot{a}\right)$$

Retaining terms with $dt^2$:

$$J = (T - \alpha t_n)\delta \tag{3.19}$$

$$\hat{C}(t_{n-1}) \cdot \left(a_n - \frac{dt}{2}\dot{a}_{n-1} - \frac{3dt^2}{8}\ddot{a} + \frac{dt}{2}\rho_{n-1}a_n - \frac{dt^2}{4}\rho_{n-1}\dot{a}_{n-1} - \frac{3dt^2}{8}\dot{\rho}a_n + \frac{dt^2}{8}\rho^2 a_n + (T - \alpha t_{n-1})\left(a_{n-1} + \frac{dt}{2}\dot{a}_{n-1} + \frac{dt^2}{8}\ddot{a} - \frac{dt}{2}\rho_{n-1}a_{n-1} - \frac{dt^2}{4}\rho_{n-1}\dot{a}_{n-1} - \frac{dt^2}{8}\dot{\rho}a + \frac{dt^2}{8}\rho^2 a\right)$$

Extracting the main term, and all other terms estimate to the second order with respect to dt. For this computation, $\delta\hat{C}(t_{n-1}) \approx I - dt\rho$, etc. is used:

$$J = \{(T - \alpha t_n)\delta\hat{C}(t_{n-1}) \cdot a_n + (T - \alpha t_{n-1})a_{n-1}\} + \tag{3.20}$$

$$(T - \alpha t_{n-1} - \alpha dt)(I - dt\rho)$$

$$\left(-\frac{dt}{2}\dot{a}_{n-1} - \frac{3dt^2}{8}\ddot{a} + \frac{dt}{2}\rho_{n-1}a_n - \frac{dt^2}{4}\rho_{n-1}\dot{a}_{n-1} - \frac{3dt^2}{8}\dot{\rho}a_n - \frac{dt^2}{8}\right)$$

$$\rho^2 a_n + (T - \alpha t_{n-1})\left(\frac{dt}{2}\dot{a}_{n-1} + \frac{dt^2}{8}\ddot{a} - \frac{dt}{2}\rho_{n-1}a_{n-1} - \frac{dt^2}{4}\rho_{n-1}\dot{a}_{n-1} - \frac{dt^2}{8}\dot{\rho}a + \frac{dt^2}{8}\rho^2 a\right)$$

Once again, only terms which have the second order (or lower) with respect to dt are retained:

$$J = \left\{\frac{1}{2}(T - \alpha t_n)\delta\hat{C}(t_{n-1}) \cdot a_n + \frac{1}{2}(T - \alpha t_{n-1})a_{n-1}\right\} + \tag{3.21}$$

$$\frac{dt^2}{2}\left[(T - \alpha t_{n-1}) \cdot \left(\dot{\rho}a - \frac{1}{2}\ddot{a} + \frac{1}{2}\dot{\rho}a - \frac{1}{2}\rho^2 a_n\right) + \alpha \cdot (\dot{a} - \rho a)\right]$$

Substitution of this expression in the second equation (the one obtained from two half-step formula) for $I_{n-1}$ yields:

$$I_{n-1} = \hat{C}(t_{n-1}) \cdot \left\{ \frac{1}{2}(T - \alpha t_n)\delta\hat{C}(t_{n-1}) \cdot a_n + \frac{1}{2}(T - \alpha t_{n-1})a_{n-1} \right\} + \hat{C}(t_{n-1}) \cdot \frac{dt^3}{8}\left[(T - \alpha t_{n-1})\left(\rho\dot{a} - \frac{1}{2}\ddot{a} + \frac{1}{2}\dot{\rho}a - \frac{1}{2}\rho^2 a_n\right) + \alpha \cdot (\dot{a} - \rho a)\right] + \frac{1}{4}o(dt^3) \quad (3.22)$$

Comparison with the one-step formula yields:

$$o(dt^3) = \frac{dt^3}{6}\hat{C}(t_{n-1}) \cdot \left[(T - \alpha t_{n-1})\left(\rho\dot{a} - \frac{1}{2}\ddot{a} + \frac{1}{2}\dot{\rho}a - \frac{1}{2}\rho^2 a_n\right) + \alpha \cdot (\dot{a} - \rho a)\right] \quad (3.23)$$

which produces the final expression:

$$I_{n-1} = \hat{C}(t_{n-1}) \cdot \left\{ \frac{1}{2}(T - \alpha t_n)\delta\hat{C}(t_{n-1}) \cdot a_n + \frac{1}{2}(T - \alpha t_{n-1})a_{n-1} \right\} + \frac{dt^3}{6}\hat{C}(t_{n-1}) \cdot \left[(T - \alpha t_{n-1})\left(\rho\dot{a} - \frac{1}{2}\ddot{a} + \frac{1}{2}\dot{\rho}a - \frac{1}{2}\rho^2 a\right) + \alpha \cdot (\dot{a} - \rho a)\right] \quad (3.24)$$

To summarize, a method is provided for determining navigational parameters of a moving object, comprising making pseudorange (PR) measurements at the object from signals received from ranging signal sources; making accumulated delta range (ADR) measurements at the object from signals received from the ranging signal sources; computing ADR differences between ADR measurements separated by a time interval that is greater than a time interval between consecutive ADR measurements; and estimating at least one navigation parameter of the moving object from the PR measurements and the ADR differences.

Similarly, a method is providing for determining the position and velocity of a moving object, comprising making pseudorange (PR) measurements at the object from signals received from ranging signal sources; making accumulated delta range (ADR) measurements at the object from signals received from the ranging signal sources; computing ADR differences between ADR measurements separated by a time interval that is greater than a time interval between consecutive ADR measurements; and estimating components of a state vector comprising at least position and velocity of the object at a current state from the PR measurements and the ADR differences and the state vector at a prior state.

Further yet, the methodology described herein may be embodied in a processor or computer readable medium storing instructions (e.g., software) that, when executed by processor or computer, cause the processor or computer to: obtain pseudorange (PR) measurements at the object from signals received from ranging signal sources; obtain accumulated delta range (ADR) measurements at the object from signals received from the ranging signal sources; compute ADR differences between ADR measurements separated by a time interval that is greater than a time interval between consecutive ADR measurements; and estimate at least one navigational parameter of the moving object from the PR measurements and the ADR differences.

The system and methods described herein may be embodied in other specific forms without departing from the spirit or essential characteristics thereof. The foregoing embodiments are therefore to be considered in all respects illustrative and not meant to be limiting.

What is claimed is:

1. A method of determining navigational parameters of a moving object, comprising:
    making pseudorange (PR) measurements at the object from signals received from ranging signal sources;
    making accumulated delta range (ADR) measurements at the object from signals received from the ranging signal sources;
    computing ADR differences between ADR measurements separated by a time interval that is greater than a time interval between consecutive ADR measurements;
    determining an optimal time interval between ADR measurements to be used for computing the ADR differences; and
    estimating at least one navigation parameter of the moving object from the PR measurements and the ADR differences.

2. The method of claim 1, wherein determining the optimal time interval between ADR measurements comprises computing a minimum of a variance of a velocity estimate error for two ADR measurements.

3. The method of claim 2, wherein determining the optimal time interval is dependent on an accuracy of the propagation model, such that the optimal time interval can be longer when a more accurate propagation model is used.

4. The method of claim 1, wherein estimating comprises computing partial derivatives of the ADR differences with respect to at least a velocity component of a state vector that represents position and velocity of the object to derive instantaneous velocity estimates of the object.

5. The method of claim 1, wherein (a) making comprises making PR measurements at the object from signals received from global positioning satellites (GPS).

6. The method of claim 1, wherein the time interval between consecutive ADR measurements is on the order of 100 seconds.

7. The method of claim 1, wherein estimating comprises applying a mathematical formulation that maps the ADR differences to a current state vector of the object, wherein the state vector comprises at least position and velocity of the object.

8. A method of determining navigational parameters of a moving object, comprising:
    making pseudorange (PR) measurements at the object from signals received from ranging signal sources;
    making accumulated delta range (ADR) measurements at the object from signals received from the ranging signal sources;
    computing ADR differences between ADR measurements separated by a time interval that is greater than a time interval between consecutive ADR measurements;
    estimating at least one navigation parameter of the moving object from the PR measurements and the ADR differences, wherein estimating comprises computing partial derivatives of the ADR differences with respect to at least a velocity component of a state vector that represents position and velocity of the object to derive instantaneous velocity estimates of the object and propagating the state vector with propagation equations that compute the state vector for the object at time N based on the state vector at time N−1.

9. The method of claim 8, wherein computing partial derivatives comprising computing partial derivatives of the ADR differences with respect to position and velocity of the state vector; computing partial derivatives of the ADR differences with respect to a clock and a clock drift of the object; and computing instantaneous velocity estimates of the object by using these partial derivatives in a Kalman filter to process ADR differences.

10. The method of claim 9, wherein estimating the position of the moving object comprises computing position and velocity components of the state vector using the PR measurements and the estimated instantaneous velocity measurements.

11. The method of claim 10, wherein computing partial derivatives of the ADR differences comprises computing derivatives of the object position at a past epoch with respect to a state vector at a current epoch, wherein the state vector comprises components for at least position and velocity of the object at an epoch.

12. The method of claim 11, wherein computing derivatives of the object position at a past epoch with respect to the state vector at a current epoch comprises computing a higher-order approximation with respect to a time difference between consecutive epochs.

13. The method of claim 12, wherein computing a higher-order approximation comprises propagating the state vector backwards over a time interval separating ADR measurements using a propagation routine having multiple substeps; for each of the substeps of the propagation routine, computing a $\phi$ matrix that corresponds to an element of a $\Lambda$ matrix; computing the $\Lambda$ matrix from each of the $\phi$ matrices; using the $\Lambda$ matrix, computing partials of the object position at a past epoch with respect to position and velocity of the state vector.

14. The method of claim 13, and further comprising propagating the state vector using a force model and an integration routine, and propagating a covariance matrix by computing a partial derivative of the state vector at the next epoch with respect to the state vector at the current epoch.

15. The method of claim 14, wherein the state vector has partitions for position, velocity, clock and clock drift of the object, wherein propagating the state vector comprises computing a matrix having partitions for derivatives of positions with respect to velocity, derivatives of position with respect to clock, derivatives of position with respect to clock drift, derivatives of velocity with respect to position, derivatives of velocity with respect to clock and derivatives of velocity with respect to clock drift.

16. A method of determining navigational parameters of a moving object, comprising:
    making pseudorange (PR) measurements at the object from signals received from ranging signal sources;
    making accumulated delta range (ADR) measurements at the object from signals received from the ranging signal sources;
    computing ADR differences between ADR measurements at two epochs separated by a time interval which is greater than a time period between consecutive epochs at which ADR measurements are made;
    estimating at least one navigation parameter of the moving object from the PR measurements and the ADR differences.

17. The method of claim 16, wherein (c) computing comprises computing ADR differences between ADR measurements at two epochs separated by said time interval which is several orders of magnitude greater than the time period between consecutive epochs at which ADR measurements are made.

18. A method of determining navigational parameters of a moving object, comprising:
    making pseudorange (PR) measurements at the object from signals received from ranging signal sources;
    making accumulated delta range (ADR) measurements at the object from signals received from the ranging signal sources;
    computing ADR differences between ADR measurements separated by a time interval that is greater than a time interval between consecutive ADR measurements;
    estimating at least one navigation parameter of the moving object from the PR measurements and the ADR differences, wherein estimating further comprises propagating a state vector based on inertial measurement data produced by an inertial measurement unit (IMU) associated with said object.

19. The method of claim 18, wherein propagating comprises computing an observation matrix comprising partial derivatives of the ADR differences with respect to a state vector for the object, wherein the state vector comprises an estimate of the position, velocity, attitude and error states of inertial measurement data produced by the IMU associated with said object.

20. The method of claim 19, wherein computing the observation matrix comprises computing a rotation matrix that transforms a vector representing gyro sensor data in body axes of the IMU to an earth centered inertial (ECI) coordinate system and propagating the rotation matrix over an epoch in order to propagate the attitude component of the state vector.

21. The method of claim 20, wherein computing the observation matrix comprises propagating the position and velocity components of the state vector.

22. The method of claim 21, and further comprising computing a misalignment vector that characterizes misalignment parameters of the gyro sensor in the IMU, including the misalignment vector in the Kalman filter state vector.

23. The method of claim 22, and further comprising computing partial derivatives of the state vector at the end of each epoch with respect to the state vector at the start of the epoch to produce a forward propagation matrix, wherein at each epoch the attitude partition of the state vector is represented by Euler angles with respect to a current estimate of the attitude.

24. The method of claim 23, and further comprising computing a backward propagation matrix over multiple epochs.

25. The method of claim 24, and further comprising backward propagating the state vector with the backward propagation matrix using a recursive algorithm.

26. A method for determining the position and velocity of a moving object, comprising:
    making pseudorange (PR) measurements at the object from signals received from ranging signal sources;
    making accumulated delta range (ADR) measurements at the object from signals received from the ranging signal sources;
    computing ADR differences between ADR measurements separated by a time interval that is greater than a time interval between consecutive ADR measurements; and
    estimating components of a state vector comprising at least position and velocity of the object at a current state from the PR measurements and the ADR differences and the state vector at a prior state, wherein estimating comprises computing partial derivatives of the ADR differences with respect to at least a velocity component of the state vector to derive instantaneous velocity estimates of the object.

27. The method of claim 26, wherein computing comprises computing ADR differences for ADR measurements separated by said time interval, wherein said time interval is determined by computing a minimum of a variance of a velocity estimate error for two ADR measurements.

28. The method of claim 26, wherein computing partial derivatives of the ADR differences comprises computing derivatives of the object position at a past epoch with respect to the state vector at a current epoch.

29. The method of claim 28, wherein computing derivatives of the object position at a past epoch with respect to the state vector at a current epoch comprises computing a higher-order approximation with respect to a time difference between consecutive epochs.

30. The method of claim 29, wherein computing a higher-order approximation comprises propagating the state vector backwards over a time interval separating ADR measurements using a propagation routine having multiple substeps; for each of the substeps of the propagation routine, computing a $\phi$ matrix that corresponds to an element of a $\Lambda$ matrix; computing the $\Lambda$ matrix from each of the $\phi$ matrices; using the $\Lambda$ matrix, computing partials of the object position at a past epoch with respect to position and velocity of the state vector.

31. The method of claim 30, and further comprising propagating the state vector using a force model and an integration routine, and propagating a covariance matrix by computing a partial derivative of the state vector at the next epoch with respect to the state vector at the current epoch.

32. The method of claim 26, wherein estimating comprises propagating the state vector with propagation equations that compute the state vector for the object at time N based on the state vector at time N−1.

33. The method of claim 26, wherein estimating comprises processing with a Kalman filter an ADR measurement residual for a pair of ranging signal sources with a partials matrix comprising a first partition for the object position and velocity defined by a difference of two terms, each term for a corresponding ranging signal source, and a second partition for the object clock and clock drift.

34. The method of claim 26, wherein computing comprises computing ADR differences between ADR measurements at two epochs separated by said time interval which is several orders of magnitude greater than a time period between consecutive epochs at which ADR measurements are made.

35. The method of claim 26, wherein estimating further comprises propagating the state vector based on inertial measurement data produced by an inertial measurement unit (IMU) associated with said object.

36. The method of claim 35, wherein propagating comprises computing an observation matrix comprising partial derivatives of the ADR differences with respect to a state vector for the object, wherein the state vector further comprises an estimate of the attitude and error states of inertial measurement data produced by the IMU associated with said object.

37. The method of claim 36, wherein computing the observation matrix comprises computing a rotation matrix that transforms a vector representing gyro sensor data in body axes of the IMU to an earth centered inertial (ECI) coordinate system and propagating the rotation matrix over an epoch in order to propagate the attitude component of the state vector.

38. The method of claim 37, wherein computing the observation matrix comprises propagating the position and velocity components of the state vector, and further comprising computing a misalignment vector that characterizes misalignment parameters of the gyro sensor in the IMU, including the misalignment vector in the Kalman filter state vector.

39. The method of claim 38, and further comprising computing partial derivatives of the state vector at the end of each epoch with respect to the state vector at the start of the epoch to produce a forward propagation matrix, wherein at each epoch the attitude partition of the state vector is represented by Euler angles with respect to a current estimate of the attitude.

40. The method of claim 39, and further computing a backward propagation matrix over multiple epochs, and backward propagating the state vector with the backward propagation matrix using recursive.

41. The method of claim 26, wherein the time interval between consecutive ADR measurements is on the order of 100 seconds.

42. The method of claim 26, wherein making ADR measurements comprises making ADR measurements of the object while it has a non-constant velocity between consecutive ADR measurements.

43. The method of claim 26, wherein estimating comprises applying a mathematical formulation that maps the ADR differences to the current state vector of the object.

44. A processor readable medium storing instructions that, when executed by a processor, cause the processor to:
   obtain pseudorange (PR) measurements at the object from signals received from ranging signal sources;
   obtain accumulated delta range (ADR) measurements at the object from signals received from the ranging signal sources;
   compute ADR differences between ADR measurements separated by a time interval that is greater than a time interval between consecutive ADR measurements; and
   estimate at least one navigational parameter of the moving object from the PR measurements and the ADR differences by applying a mathematical formulation that maps the ADR differences to a current state vector of the object, wherein the state vector comprises at least position and velocity of the object.

45. The processor readable medium of claim 44, and further comprising instructions that cause the processor to obtain ADR measurements such that the time interval between consecutive ADR measurements is on the order of 100 seconds.

46. The processor readable medium of claim 44, and further comprising instructions that cause the processor to obtain ADR measurements of the object while it has a non-constant velocity between consecutive ADR measurements.

47. A method of determining navigational parameters of a moving object, comprising:
   making pseudorange (PR) measurements at the object from signals received from ranging signal sources, wherein making ADR measurements comprises making ADR measurements of the object while it has a non-constant velocity between consecutive ADR measurements;
   making accumulated delta range (ADR) measurements at the object from signals received from the ranging signal sources;
   computing ADR differences between ADR measurements separated by a time interval that is greater than a time interval between consecutive ADR measurements; and
   estimating at least one navigation parameter of the moving object from the PR measurements and the ADR differences.

* * * * *